United States Patent
Hunger et al.

(10) Patent No.: US 12,208,830 B2
(45) Date of Patent: Jan. 28, 2025

(54) CARRIAGE FOR GUIDED AUTONOMOUS LOCOMOTION

(71) Applicant: GlüxKind Technologies Inc., Vancouver (CA)

(72) Inventors: Anne Hunger, Vancouver (CA); Zi Wen Huang, Vancouver (CA); Check Hay Janson Chan, Vancouver (CA); Anderson Jia Lin Kwan, Surrey (CA)

(73) Assignee: GlüxKind Technologies Inc., Vancouver (CA)

( * ) Notice: Subject to any disclaimer, the term of this patent is extended or adjusted under 35 U.S.C. 154(b) by 0 days.

(21) Appl. No.: 18/385,038

(22) Filed: Oct. 30, 2023

(65) Prior Publication Data
US 2024/0092409 A1 Mar. 21, 2024

Related U.S. Application Data

(63) Continuation-in-part of application No. PCT/CA2022/050659, filed on Apr. 29, 2022.
(Continued)

(51) Int. Cl.
*B62B 5/00* (2006.01)
*B62B 9/08* (2006.01)
(Continued)

(52) U.S. Cl.
CPC .............. *B62B 5/0069* (2013.01); *B62B 9/08* (2013.01); *B62B 9/20* (2013.01); *G05D 1/0214* (2013.01); *G05D 1/0255* (2013.01)

(58) Field of Classification Search
CPC .......... B62B 5/0069; B62B 9/08; B62B 9/20; G05D 1/0214; G05D 1/0255
See application file for complete search history.

(56) References Cited

U.S. PATENT DOCUMENTS

2008/0224508 A1*  9/2008  Yang ..................... B62B 7/145
                                                       297/217.3
2012/0228854 A1*  9/2012  Mountz ................. B62B 9/20
                                                       280/655.1
(Continued)

FOREIGN PATENT DOCUMENTS

CN          106672051 A        5/2017
CN          207123758 U        3/2018
(Continued)

OTHER PUBLICATIONS

International Search Report PCT/CA2022//050659.
EP 22 79 4158; Supplementary European Search Report; Date: Nov. 2, 20240.

*Primary Examiner* — Harry Y Oh
*Assistant Examiner* — Danielle M Jackson
(74) *Attorney, Agent, or Firm* — Caldwell Intellectual Property Law

(57) ABSTRACT

In an aspect, a carriage for guided autonomous locomotion may include a computing device configured to produce a safety perimeter, wherein producing further comprises receiving at least an environmental input as a function of an environmental sensor, and producing the safety perimeter as a function of the environmental input, outline at least a corrective action as a function of the safety perimeter, wherein outlining further comprises determining a required force, and outlining the at least a corrective action as a function of the safety perimeter and required force using a corrective machine-learning model, and initiate the at least a corrective action.

18 Claims, 14 Drawing Sheets

Related U.S. Application Data

(60) Provisional application No. 63/182,178, filed on Apr. 30, 2021.

(51) Int. Cl.
  *B62B 9/20* (2006.01)
  *G05D 1/00* (2024.01)

(56) References Cited

U.S. PATENT DOCUMENTS

| | | | | |
|---|---|---|---|---|
| 2013/0162396 A1* | 6/2013 | Yang | ............... | A61G 5/0833 |
| | | | | 701/22 |
| 2016/0101803 A1* | 4/2016 | Ahlemeier | ............... | B62B 9/08 |
| | | | | 180/167 |
| 2016/0304004 A1 | 10/2016 | Sandbothe | | |
| 2017/0014224 A1 | 5/2017 | Heo et al. | | |
| 2019/0080574 A1* | 3/2019 | Cai | ............... | B62B 9/00 |
| 2019/0308652 A1* | 10/2019 | Green | ............... | B60T 8/1701 |
| 2020/0023755 A1* | 1/2020 | Chiesa | ............... | B62B 9/00 |
| 2020/0081440 A1* | 3/2020 | Suzuki | ............... | G05D 1/024 |
| 2021/0064048 A1 | 3/2021 | Dariush | | |
| 2021/0094577 A1 | 4/2021 | Shalev-Shwartz | | |
| 2021/0129793 A1* | 5/2021 | Murray | ............... | G08G 1/16 |
| 2021/0309275 A1* | 10/2021 | Lee | ............... | B62B 9/14 |
| 2022/0153180 A1* | 5/2022 | Kanata | ............... | B60P 3/06 |

FOREIGN PATENT DOCUMENTS

| | | |
|---|---|---|
| KR | 20190013368 A * | 2/2019 |
| WO | WO2019027161 A1 | 2/2019 |
| WO | WO2022226658 A | 11/2022 |

* cited by examiner

CARRIAGE FOR GUIDED AUTONOMOUS LOCOMOTION

CROSS-REFERENCE TO RELATED APPLICATIONS

This application is a continuation-in-part of International Application No. PCT/CA2022/050659 filed Apr. 29, 2022 and entitled "CARRIAGE FOR GUIDED AUTONOMOUS LOCOMOTION," which claims the benefit of priority of U.S. Provisional Patent Application Ser. No. 63/182,178, filed on Apr. 30, 2021, and titled "CARRIAGE FOR GUIDED AUTONOMOUS LOCOMOTION," which is incorporated by reference herein in its entirety.

FIELD OF THE INVENTION

The present invention generally relates to the field of autonomous locomotion. In particular, the present invention is directed to a carriage for guided autonomous locomotion.

BACKGROUND

Presently, baby-strollers are unsafe and vulnerable to user error, e.g. using the stroller while performing other tasks such as soothing babies or chasing toddlers. Even the most watchful parent may find themselves, at times, without complete control of a stroller at all times given the plurality of extraneous circumstances. Lack of complete control of a stroller is dangerous to the child as well as surrounding individuals that often results in large medical expenses

SUMMARY OF THE DISCLOSURE

In an aspect, a carriage for guided autonomous locomotion, the carriage including: a handle bar including a rear camera configured to detect an individual; a computing device configured to: identify an authorized individual; obtain a locking signal as a function of a compartment configured to ensconce a child; produce a safety perimeter, wherein producing further includes: generating at least an environmental input using an environmental sensor; and producing the safety perimeter as a function of the at least an environmental input; determine an assistance element, wherein the assistance element includes; identifying a control limiter; and determining the assistance element as a function of the control limiter; outline at least a corrective action as a function of the safety perimeter and assistance element, wherein outlining further includes: determining a required force as a function of the assistance element; and outlining the at least the corrective action as a function of the safety perimeter and the required force using a control machine-learning model; and initiate the at least a corrective action.

In another aspect, a method of use carriage for guided autonomous locomotion, wherein the method includes: detecting, using a rear camera, an individual; identifying, using a computing device, an authorized individual; obtaining, using the computing device, a locking signal as a function of a compartment configured to ensconce a child; producing, using the computing device, a safety perimeter, wherein producing the safety perimeter further includes: generating, using the computing device, at least an environmental input using an environmental sensor; and producing, using the computing device, the safety perimeter as a function of the at least an environmental input; determining, using the computing device, an assistance element, wherein determining the assistance element further includes: identifying, using the computing device, a control limiter; and determining, using the computing device, the assistance element as a function of the control limiter; outlining, using the computing device, at least a corrective action as a function of the safety perimeter and the assistance element, wherein outlining the at least a corrective action further includes: determining, using the computing device, a required force as a function of the assistance element; and outlining, using the computing device, the at least the corrective action as a function of the safety perimeter and the required force using a control machine-learning model; and initiating, using the computing device, the at least a corrective action.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a carriage and methods for guided autonomous locomotion. In an embodiment, this disclosure produces a safety perimeter using at least an environmental input. Aspects of the present disclosure can also be used to outline at least a corrective action. This is so, at least in part, because this disclosure utilizes a machine-learning model. Aspects of the present disclosure allow for initiating the at least a corrective action. Exemplary embodiments illustrating aspects of the present disclosure are described below in the context of several specific examples.

Figure 1:
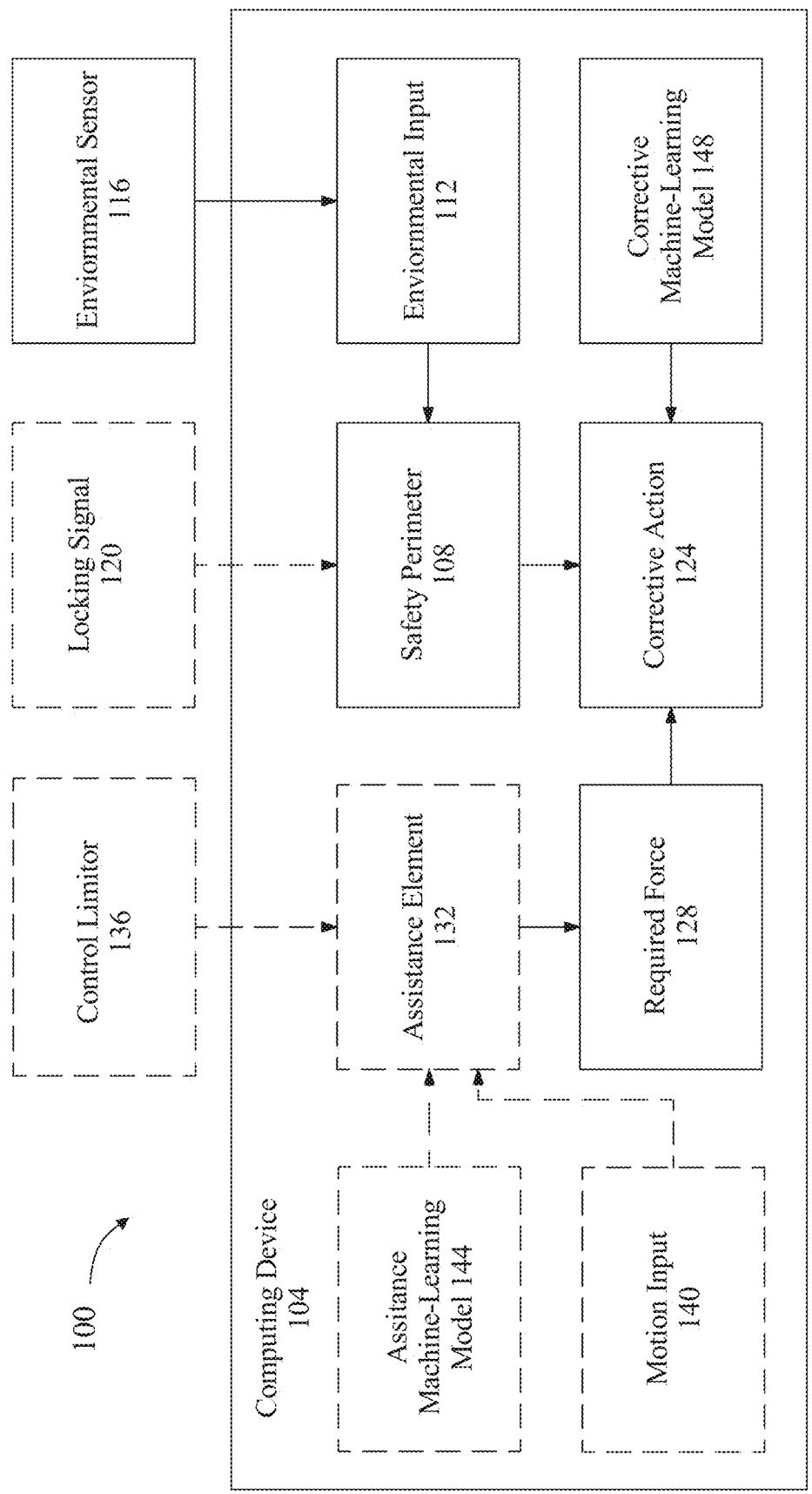
FIG. 1 is a block diagram of a carriage for guided autonomous locomotion according to an embodiment of the invention.

Referring now to FIG. 1, an exemplary embodiment of a carriage 100 for guided autonomous locomotion is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a user mobile device such as a mobile telephone, laptop, tablet, computer, and/or smartphone. Computing device 104 may include a single computing device operating independently, or may include two or more computing devices operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include, but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 may produce a safety perimeter 108. As used in this disclosure, a "safety perimeter" is an area surrounding carriage 100 that represents area around carriage 100 not containing any imminent threats, dangers, obstacles, or the like. In an embodiment, safety perimeter 108 may include a hexagonal area, circular area, pentagonal area, square area, rectangular area, heptagonal area, and the like thereof. For example, and without limitation, safety perimeter 108 may include an area comprising a length of 10 meters and a width of 6 meters, wherein carriage 100 is located centrally in the area. As a further non-limiting example, safety perimeter 108 may include an area comprising a circular area, wherein a 2-meter radius is established from carriage 100. Safety perimeter 108 may be produced as a function of receiving at least an environmental input 112. As used in this disclosure, an "environmental input" is information that relates to one or more external physical elements. In an embodiment, environmental input may include one or more external physical elements located within safety perimeter 108. As used in this disclosure, a "physical element" is a physical property that represents at least an entity, matter, and/or object. For example, and without limitation a physical element may include, without limitation, a light, voltage, current, sound, chemical, pressure, humidity, and the like thereof. For example, and without limitation, environmental input 112 may be comprised of a light datum that denotes a harsh light source and/or high UV index interacting with carriage 100. As a further non-limiting example, environmental input 112 may be comprised of an acoustic data denoting that the decibels are intense and/or powerful in safety perimeter 108. As a further non-limiting example environmental input 112 may include an image and/or visual representation of an area. For example, and without limitation, environmental input may denote an image of an individual and/or object present within safety perimeter 108. In an embodiment, computing device 104 may receive environmental input 112 as a function of obtaining a hazardous indicator. As used in this disclosure, a "hazardous indicator" is an element of data denoting a harmful and/or traumatic object, person, and/or event that may enter safety perimeter 108. For example, and without limitation, hazardous indicator may denote a hazardous object of a cliff and/or steep hill that is located 3 meters north of the boundary of safety perimeter 108. As a further non-limiting example, hazardous indicator denotes a speeding vehicle that is entering safety perimeter 108 from the eastern direction. As a further non-limiting example, hazardous indicator may denote a hazardous object such as, stop signs, streetlights, and/or other traffic related objects. Computing device 104 may alert a user of hazardous indicator using haptic feedback and performing a corrective action as described further below. Computing device 104 may also transmit a notification of a hazardous indicator to user device, and the like.

In an embodiment, and still referring to FIG. 1, environmental input 112 may be received as a function of an environmental sensor 116. As used in this disclosure an "environmental sensor" is a device that detects or measures a physical property and records, indicates, or otherwise responds to the detected or measured physical element. In an embodiment, environmental sensor 116 may be comprised of one or more of imaging and other sensors, such as optical cameras, infrared cameras, 3D cameras, multispectral cameras, polarized cameras, chemical sensors, motion sensors, ranging sensors, detection or imaging using radio frequencies component, such as radar, terahertz or millimeter wave imagers, seismic sensors, magnetic sensors, weight/mass sensors, ionizing radiation sensors, and the like thereof. In another embodiment, environmental sensor may include a device that detects a physical element such as a light sensor, acoustic sensor, chemical sensor, force sensor, pressure sensor, temperature sensor, humidity sensor, gyroscopic sensor, proximity sensor, flow sensor, and the like thereof. In another embodiment, environmental sensor 112 may include, without limitation any of a pressure sensor, a touchscreen, a strain gauge, a loadcell, a machine camera and system, a light detection and ranging (LIDAR) system, a proximity sensor, a time of flight (ToF) sensor, a hyperspectral imaging system, a camera, a microphone, inertial measurement unit system, an accelerometer, or gyroscope. In some embodiments, an environmental sensor 116 may comprise a computer vision, also called a machine vision, system. A machine vision system may use images from one or more cameras, to make a determination about safety perimeter 108 and/or an environment. For example, and without limitation, a machine vision system may be used for world modeling or registration of objects within an environment. In an embodiment, registration may include image processing, such as without limitation object detection, object recognition, object tracking, dynamic object path prediction, feature detection, edge/corner detection, lane detection, semantic segmentation, instance segmentation and the like. As a non-limiting example, feature detection may include scale invariant feature transform (SIFT), Canny edge detection, Shi Tomasi corner detection, and the like. In another embodiment, and without limitation, registration may include one or more transformations to orient a camera frame (or an image or video stream) relative a three-dimensional coordinate system; exemplary transformations include without limitation holography transforms and affine transforms.

In an embodiment, and still referring to FIG. 1, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame. A third dimension of registration, representing depth and/or a z axis, may be detected by comparison of two frames. For example, and without limitation, first frame may include a pair of frames captured using a pair of cameras (e.g., stereoscopic camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. In an embodiment, this process may be conducted iteratively with multiple objects in field of view, including without limitation, environmental inputs of interest identified by a classifier and/or indicated by an individual, wherein a classifier is described in detail below. In an embodiment, x and y axes may be chosen to span a plane common to two cameras used for stereoscopic image capturing and/or an xy plane of a first frame; a result, x, and y translational components and $\phi$ may be pre-populated in translational and rotational matrices, for affine transformation of coordinates of object, as described above in detail. Additionally and/or alternatively, initial x and y coordinates and/or guesses at transformational matrices may be performed between first frame and second frame, as described above in detail. For each point of a plurality of points on object and/or edge and/or edges of object as described above in detail, x, and y coordinates of a first stereoscopic frame may be populated, with an initial estimate of z coordinates based on assumptions about object, such as, but not limited to, an assumption that ground is substantially parallel to an xy plane as selected above. Z coordinates, and/or x, y, and z coordinates, registered using image capturing and/or object identification processes as described above in detail may then be compared to coordinates predicted using initial guess at transformation matrices; an error function may be computed using by comparing the two sets of points, and new x, y, and/or z coordinates, may be iteratively estimated and compared until the error function drops below a threshold level.

Still referring to FIG. 1, a machine vision camera may be included in an environmental sensor 116, wherein the machine vision camera may include, without limitation, an OpenMV Cam H7 from OpenMV, LLC of Atlanta, Georgia, U.S.A. OpenMV Cam may comprise a small, low power, microcontroller which allows execution of machine vision applications. OpenMV Cam may comprise an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording. In an embodiment, machine vision camera may include an image classifier to make classifications using one or more images. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or Naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A: and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm: $1=\sqrt{\Sigma_{i=0}^{n} a_i^2}$, where ai is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

In an embodiment, and still referring to FIG. 1, computing device 104 may produce safety perimeter 108 as a function of obtaining a locking signal 120 as a function of a compartment, wherein a compartment is a location and/or environment that is configured to ensconce a child as described below in detail, in reference to FIG. 4. For example, and without limitation, compartment configured to ensconce a child may include a stroller seat, a bassinet, or a car seat. As used in this disclosure a "locking signal" is a signal that at least recognizes that a compartment configured to ensconce a child is secured in carriage 100. Locking signal 120 may contain at least an insertion sensor. As used in this disclosure "insertion sensor" is a device that detects a compartment configured to ensconce a child and indicates, or otherwise responds to the detected compartment. Insertion sensor may be comprised of one or more of imaging and other sensors, such as optical cameras, infrared cameras, 3D cameras, multispectral cameras, hyperspectral cameras, polarized cameras, piezoelectric sensors, motion sensors, ranging sensors, light radar component, such as lidar, detection, magnetic sensors, weight/mass sensors. As a non-limiting example an insertion sensor may be comprised of a of magnetic sensor, wherein the magnetic sensor may transmit locking signal 120 as a function of the compartment being magnetically attached and/or locked to carriage 100. Additionally or alternatively, computing device 104 may produce safety perimeter as a function of obtaining an occupancy signal. As used in this disclosure an "occupancy signal" is a signal that at least recognizes that a child is located within the compartment. Occupancy signal may be obtained as a function of one or more occupancy sensors. As used in this disclosure an "occupancy sensor" is a device that detects the presence of a child in the compartment and indicates, or otherwise responds to the detected child. Occupancy sensor may be comprised of one or more of imaging and other sensors, such as optical cameras, infrared cameras, 3D cameras, multispectral cameras, hyperspectral cameras, polarized cameras, piezoelectric sensors, motion sensors, ranging sensors, light radar component, such as lidar, detection, magnetic sensors, weight/mass sensors.

In an embodiment, and still referring to FIG. 1, computing device 104 may produce safety perimeter 108 as a function of identifying an authorized individual. As used in this disclosure an "authorized individual" is an individual that is allowed to approach and/or be near the carriage. For example, and without limitation, authorized individual may include a parent, such as a mother and/or father, a brother, sister, stepbrother, stepsister, aunt, uncle, cousin, grandparent, caretaker, nanny. In an embodiment a first authorized user may authorize and/or allow a family friend, colleague, and/or other third party to be a second authorized user. In an embodiment computing device 104 identify an authorized individual as a function of detection of text and/or words as a function of a language processing module. Language processing module may include any hardware and/or software module. Language processing module may be configured to extract from one or more conversations and/or texts, one or more words. One or more words may include, without limitation, strings of one or more characters, including without limitation any sequence or sequences of letters, numbers, punctuation, diacritic marks, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a written communication and/or verbal communication and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs has used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naïve-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents and/or recordings of conversations to generate associations between language elements in a language processing module, and diagnostic engine may then use such associations to analyze words extracted from one or more documents and/or recordings and determine that the one or more documents and/or verbal communications indicate significance of a category. In an embodiment, language module and/or computing device 104 may perform this analysis using a selected set of significant verbal communications and/or written texts such as recorded communications of previous authorized individuals, textual communication from an authorized individual's device and the like thereof. Authorized individuals may identify or enter such verbal communication recordings and/or written texts via graphical user interface or may communicate identities of significant verbal communication recordings and/or written texts according to any other suitable method of electronic communication. Verbal communication recordings and/or written texts may be entered into a computing device by being uploaded by an authorized individual using, without limitation, file transfer protocol (FTP) or other suitable methods for transmission and/or upload of documents.

Still referring to FIG. 1, computing device 104 may produce safety perimeter 108 as a function of determining a wireless range. As used in this disclosure a "wireless range" is distance and/or area that a wireless signal may extend through to promote communication between one or more devices. For example, and without limitation, wireless range may include a range of 50 meters and/or 160 ft. from a central emission location. As a further non-limiting example, wireless range may include a range of 100 meters and/or 300 ft. from a central emission location. In an embodiment and without limitation, wireless range may include one or more wireless communications such as infrared communication, broadcast radio communication, Microwave communication, wi-fi communication, cellular communication, Bluetooth communication, and the like thereof. In an embodiment, and without limitation, wireless range may be determined as a function of identifying a signal strength. As used in this disclosure, a "signal strength" is a field strength of the communication representing the transmitter power output received by receiving device at a distance from the transmitting device. For example, and without limitation, signal strength may include a signal comprising −70 dBm for a moderate signal strength. As a further non-limiting example, signal strength may include a signal comprising −65 dBm for a strong signal strength. As a further non-limiting example, signal strength may include a signal comprising −100 dBm for weak and/or no signal strength. In an embodiment, computing device 104 may determine wireless range as a function of a user device. As used in this disclosure, a "user device" is a one or more devices that a user may utilize to communicate with carriage 100. For example, and without limitation, user device may include a phone, tablet, computer, smartphone, smart watch, desktop computer, mobile device, and the like thereof. In an embodiment, and without limitation, computing device 104 may determine a distance as a function of wireless range and user device. For example, and without limitation a distance of 5 meters may be determined for a wireless range associated with a strong Bluetooth signal strength and a user device of a smartphone.

Still referring to FIG. 1, computing device 104 may produce safety perimeter 108 as a function of environmental input 112 and wireless range using a safety machine-learning model. As used in this disclosure "safety machine-learning model" is a machine-learning model to produce a safety perimeter output given environmental inputs and/or wireless ranges as inputs, this is in contrast to a non-machine learning software program where the commands to be executed are determined in advance by a user and written in a programming language. Safety machine-learning model may include one or more safety machine-learning processes such as supervised, unsupervised, or reinforcement machine-learning processes that computing device 104 and/or a remote device may or may not use in the determination of safety perimeter 108. As used in this disclosure "remote device" is an external device to computing device 104. Safety machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, computing device 104 may train safety machine-learning process as a function of a safety training set. As used in this disclosure "safety training set" is a training set that correlates an environmental input and/or wireless range to a safety perimeter. For example, and without limitation, an environmental input of a street curb and a wireless range of a strong signal due to 2 meters from user device may relate to a safety perimeter of 2 meters in a circular pattern. The safety training set may be received as a function of user-entered valuations of environmental inputs, wireless ranges, and/or safety perimeters. Computing device 104 may receive safety training set by receiving correlations of environmental inputs, and/or wireless ranges that were previously received and/or determined during a previous iteration of determining safety perimeters. The safety training set may be received by one or more remote devices that at least correlate an environmental input and/or wireless range to a safety perimeter. The safety training set may be received in the form of one or more user-entered correlations of an environmental input and/or wireless range to a safety perimeter. Additionally or alternatively, a user may include an authorized user, wherein an authorized user may include, without limitation, a parent, such as a mother and/or father, a brother, sister, stepbrother, stepsister, aunt, uncle, cousin, grandparent, a family friend, colleague, third party, and the like thereof.

Still referring to FIG. 1, computing device 104 may receive safety machine-learning model from a remote device that utilizes one or more safety machine learning processes, wherein a remote device is described above in detail. For example, and without limitation, a remote device may include a computing device, external device, processor, and the like thereof. Remote device may perform the safety machine-learning process using the safety training set to generate safety perimeter 108 and transmit the output to computing device 104. Remote device may transmit a signal, bit, datum, or parameter to computing device 104 that at least relates to safety perimeter 108. Additionally or alternatively, the remote device may provide an updated machine-learning model. For example, and without limitation, an updated machine-learning model may be comprised of a firmware update, a software update, a safety machine-learning process correction, and the like thereof. As a non-limiting example a software update may incorporate a new environmental input that relates to a modified wireless range. Additionally or alternatively, the updated machine learning model may be transmitted to the remote device, wherein the remote device may replace the safety machine-learning model with the updated machine-learning model and determine the safety perimeter as a function of the environmental input using the updated machine-learning model. The updated machine-learning model may be transmitted by the remote device and received by computing device 104 as a software update, firmware update, or corrected safety machine-learning model. For example, and without limitation safety machine-learning model may utilize a random forest machine-learning process, wherein the updated machine-learning model may incorporate a gradient boosting machine-learning process. In an embodiment, and without limitation, safety machine-learning model may identify safety perimeter 108 as a function of one or more classifiers, wherein a classifier is described above in detail.

Still referring to FIG. 1, computing device may outline at least a corrective action 124 as a function of safety perimeter 108. As used in this disclosure, a "corrective action" is one or more responses and/or measures carriage 100 may perform. For example, and without limitation, corrective action 124 may include a braking mechanism. As used in this disclosure, a "braking mechanism" is a mechanism to resist a motion of carriage 100. For example, and without limitation, braking mechanism may include a mechanical device to inhibit motion by absorbing one or more kinetic energies from a system in motion. As a further non-limiting example, braking mechanism may include one or more frictional braking mechanisms, pumping braking mechanisms, electromagnetic braking mechanisms, and the like thereof. Additionally or alternatively corrective action 124 may include a steering component. As used in this disclosure, a "steering component" is a device capable of altering and/or modifying the direction of carriage 100. For example, and without limitation steering component may shift and/or alter carriage from moving in a direction comprising 120° southeast towards 80° northeast. Additionally or alternatively, outlining corrective action 124 may include determining a best possible path. As used in this disclosure a "best possible path" is a predicted and/or identified opporture path that carriage 100 may follow to avoid and/or evade the plurality of hazardous indicators. For example, best possible path may include a path of 10 m forward, 8 m to the left, and 2 m to the right to avoid a speeding vehicle, wherein the path evades one or more hazardous indicators, wherein a hazardous indicator is described above, in detail. In an embodiment and without limitation, outlining corrective action 124 may include a stroller controller. As used in this disclosure a "stroller controller" is a component and/or computing device that separates control of a velocity and/or steering function of carriage 100. Computing device 104 may outline corrective action 124 as a function of determining a required force 128. As used in this disclosure a "required force" is an amount of energy and/or force necessary to adjust and/or maneuver carriage 100. For example and without limitation, required force 128 may include a force of 8 N to shift the direction of motion of the carriage from 154° northwest to 30° northeast. As a further non-limiting example, required force 128 may include applying 434 pounds of force on a brake pad to at least restrict motion and/or stop motion of carriage 100.

Still referring to FIG. 1, computing device 104 may determine required force 128 as a function of distinguishing an assistance element 132. As used in this disclosure an "assistance element" is an element of datum denoting one or more external forces acting on carriage 100. For example, and without limitation, assistance element 132 may comprise an external force comprising an authorized user may be providing 2 N of force towards restricting forward motion. As a further non-limiting example, assistance element 132 may comprise an external force of wind that is exerting 1 beaufort scale unit of force in altering the direction of carriage 100. In an embodiment, computing device 104 may distinguish assistance element 132 as a function of identifying a controller limiter 136. As used in this disclosure a "control limiter" is an object, entity, and/or mechanism that is affecting the movement and/or direction of carriage 100. For example, and without limitation, control limiter 132 may include one or more authorized individuals that are exerting a force on carriage 100. As a further non-limiting example, control limiter 132 may include one or more frictional forces that are exerting a force on carriage 100. In an embodiment, control limiter may be identified as a function of one or more control limiter sensors, wherein control limiter sensors include any of the sensors as described above in detail. For example, and without limitation, control limiter sensor may sense a characteristic that is indicative of an authorized individual's presence, for example a carriage 100 may identify one or more facial images of an authorized user present in close proximity. As a further non-limiting example, control limiter sensors may include one or more optical devices and/or ultrasonic detectors capable of indicating the presence of an authorized user in close proximity. Computing device 104 may receive a motion input 140 as a function of a motion sensor, wherein a motion sensor includes any of the sensor as described above, in detail. As used in this disclosure a "motion input" is an element of datum denoting one or more movements of carriage 100. For example, motion input 140 may denote an element of datum associated with a speed, velocity, acceleration, and the like thereof. For example, and without limitation, a ToF imager or another range-imaging camera may be used to receive one or more movements of carriage in a direction. As a further non-limiting example, a range-imaging camera comprising an Intel® RealSense™ D430 Module, from Intel® of Mountainview, California, U.S.A. D430 Module comprises active infrared (IR) illumination and a stereoscopic camera, having global shutters and frame rate of up to 90 fps may be incorporated to receive one or more motion inputs of carriage 100.

Still referring to FIG. 1, computing device 104 may distinguish assistance element 132 as a function of control limiter 136 and motion input 140 using an assistance machine-learning model 144. As used in this disclosure, "assistance machine-learning model" is a machine-learning model to produce an assistance element output given control limiters and/or motion inputs as inputs; this is in contrast to a non-machine learning software program where the commands to be executed are determined in advance by a user and written in a programming language. Assistance machine-learning model 144 may include one or more assistance machine-learning processes such as supervised, unsupervised, or reinforcement machine-learning processes that computing device 104 and/or a remote device may or may not use in the determination of assistance element 132. As used in this disclosure "remote device" is an external device to computing device 104. Assistance machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, computing device 104 may train assistance machine-learning process as a function of an assistance training set. As used in this disclosure an "assistance training set" is a training set that correlates a control limiter and/or motion input to an assistance element. For example, and without limitation, a control limiter of a parent presence and a motion input of 5 mph forward may relate to an assistance element of 3 N of force. The assistance training set may be received as a function of user-entered valuations of control limiters, motion inputs, and/or assistance elements. Computing device 104 may receive assistance training set by receiving correlations of control limiters, and/or motion inputs that were previously received and/or determined during a previous iteration of determining assistance elements. The assistance training set may be received by one or more remote devices that at least correlate a control limiter and/or motion input to an assistance element. The assistance training set may be received in the form of one or more user-entered correlations of a control limiter and/or motion input to an assistance element. Additionally or alternatively, a user may include an authorized user, wherein an authorized user may include, without limitation, a parent, such as a mother and/or father, a brother, sister, stepbrother, stepsister, aunt, uncle, cousin, grandparent, a family friend, colleague, third party, and the like thereof.

Still referring to FIG. 1, computing device 104 may receive assistance machine-learning model 144 from a remote device that utilizes one or more assistance machine learning processes, wherein a remote device is described above in detail. For example, and without limitation, a remote device may include a computing device, external device, processor, and the like thereof. Remote device may perform the assistance machine-learning process using the assistance training set to generate assistance element 132 and transmit the output to computing device 104. Remote device may transmit a signal, bit, datum, or parameter to computing device 104 that at least relates to assistance element 132. Additionally or alternatively, the remote device may provide an updated machine-learning model. For example, and without limitation, an updated machine-learning model may be comprised of a firmware update, a software update, an assistance machine-learning process correction, and the like thereof. As a non-limiting example a software update may incorporate a new control limiter that relates to a modified motion input. Additionally or alternatively, the updated machine learning model may be transmitted to the remote device, wherein the remote device may replace the assistance machine-learning model with the updated machine-learning model and determine the assistance element as a function of the control limiter using the updated machine-learning model. The updated machine-learning model may be transmitted by the remote device and received by computing device 104 as a software update, firmware update, or corrected assistance machine-learning model. For example, and without limitation assistance machine-learning model may utilize a random forest machine-learning process, wherein the updated machine-learning model may incorporate a gradient boosting machine-learning process. In an embodiment, and without limitation, assistance machine-learning model 144 may identify assistance element 132 as a function of one or more classifiers, wherein a classifier is described above in detail.

In an embodiment, and without limitation, computing device 104 may identify one or more functional modes as a function of assistance element 132. As used in this disclosure a "functional mode" is a manner of operation of carriage 100. In an embodiment, functional mode may include a push-assist mode. As used in this disclosure a "push-assist mode" is a mode that operates by reducing assistance element 132 to at least mitigate and/or eliminate the required/resistive force acting on the carriage. For example, an assistance element of 20 N provided by a control limiter may be reduced such that the control limiter provide 2 N and/or 0 N. In an embodiment, functional mode may include a shadow mode. As used in this disclosure a "shadow mode" is a mode that operates by increasing and/or maximizing assistance element 132. For example, and without limitation, shadow mode may denote a mode of operation, wherein carriage 100 produces no forward force and/or assistance to control limiter 136. While engaged in shadow mode carriage 100 may still train a machine learning model using an environmental input. In an embodiment, functional mode may include a hover mode. As used in this disclosure a "hover mode" is a mode that operates by initiating corrective action, wherein a corrective action is described below in detail. In embodiments, hover mode may initiate corrective action as a function of identifying an authorized individual as a using a biometric signal. Hover mode may track an authorized individual and initiate corrective action as a function of the location of the authorized individual.

Still referring to FIG. 1, computing device 104 may determine required force 128 as a function of identifying a distance requirement. As used in this disclosure, a "distance requirement" is a distance between safety perimeter 108 and an entity, matter, and/or object. For example and without limitation, distance requirement may be 20 meters between safety perimeter 108 and a crosswalk. As a further non-limiting example, distance requirement may be 1 meter between safety perimeter 108 and an unauthorized individual. As a further non-limiting example, distance requirement may denote that safety perimeter 108 is 10 m from a cliff and/or steep hill. In an embodiment and without limitation, computing device 104 may determine required force 128 as a function of identifying a fictitious force. As used in this disclosure, a "fictitious force" is an apparent force that may be determined and/or detected as a function of the acceleration of the non-inertial compartment. For example and without limitation, fictitious force may include an apparent force on the compartment ensconcing the child comprising 8 Newtons of force as a function of decelerating carriage 100. For example, and without limitation, a child may experience a fictitious force as a function of carriage 100 decelerating. Computing device 104 may identify a first fictitious force of 10 N as a function of decelerating carriage 100 over a distance of 5 meters, wherein a second fictitious force of 7 N may be identified as a function of decelerating carriage 100 over a distance of 7 meters. Computing device 104 may determine required force 128 as a function of reducing fictitious force to at least exert a smaller effect on the child ensconced in the compartment.

Still referring to FIG. 1, computing device 104 may outline corrective action 124 as a function of safety perimeter 108 and required force 128 using a corrective machine-learning model 148. As used in this disclosure, a "corrective machine-learning model" is a machine-learning model to produce a corrective action output given safety perimeters and required forces as inputs; this is in contrast to a non-machine learning software program where the commands to be executed are determined in advance by a user and written in a programming language. Corrective machine-learning model 148 may include one or more corrective machine-learning processes such as supervised, unsupervised, or reinforcement machine-learning processes that computing device 104 and/or a remote device may or may not use in the determination of corrective action, wherein a remote device is an external device to computing device 104 as described above in detail. A corrective machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, computing device 104 may train corrective machine-learning process as a function of a corrective training set. As used in this disclosure, a "corrective training set" is a training set that correlates at least a safety perimeter and a required force to a corrective action. For example, and without limitation, safety perimeter of 30 meters in a circular pattern and a required force of 10-foot pounds of braking force relate to a corrective action of applied braking force to an axle and/or rotating wheel. The corrective training set may be received as a function of user-entered valuations of safety perimeters, required forces, and/or corrective actions. Computing device 104 may receive corrective training set by receiving correlations of safety perimeters and/or required forces that were previously received and/or determined during a previous iteration of determining corrective actions. The corrective training set may be received by one or more remote devices that at least correlate a safety perimeter and required force to a corrective action, wherein a remote device is an external device to computing device 104, as described above. Corrective training set may be received in the form of one or more user-entered correlations of a safety perimeter and/or required force to a corrective action. A user may include an authorized user, wherein an authorized user may include, without limitation, a parent, such as a mother and/or father, a brother, sister, stepbrother, stepsister, aunt, uncle, cousin, grandparent, a family friend, colleague, third party, and the like thereof. Additionally or alternatively, corrective training set may be obtained as a function of collecting and/or storing training data when operating in a push assist and/or shadow mode. For example, and without limitation, control training set may be obtained as a function of a control limiter that shifts and/or maneuvers carriage 100 that opposes and/or contradicts a predicted corrective action, such that corrective training set is updated to include the contradicting prediction.

Still referring to FIG. 1, computing device 104 may receive corrective machine-learning model from a remote device that utilizes one or more corrective machine learning processes, wherein remote device is described above in detail. For example, and without limitation, remote device may include a computing device, external device, processor, and the like thereof. Remote device may perform the corrective machine-learning process using the corrective training set to generate corrective action and transmit the output to computing device 104. Remote device may transmit a signal, bit, datum, or parameter to computing device 104 that at least relates to corrective action. Additionally or alternatively, the remote device may provide an updated machine-learning model. For example, and without limitation, an updated machine-learning model may be comprised of a firmware update, a software update, a corrective machine-learning process correction, and the like thereof. As a non-limiting example a software update may incorporate a new safety perimeter that relates to a modified required force. Additionally or alternatively, the updated machine learning model may be transmitted to the remote device, wherein the remote device may replace the corrective machine-learning model with the updated machine-learning model and determine the physiological as a function of the required force using the updated machine-learning model. The updated machine-learning model may be transmitted by the remote device and received by computing device 104 as a software update, firmware update, or corrected corrective machine-learning model. For example, and without limitation a corrective machine-learning model may utilize a neural net machine-learning process, wherein the updated machine-learning model may incorporate polynomial regression machine-learning process. In an embodiment, and without limitation, corrective machine-learning model may identify corrective action as a function of one or more classifiers, wherein a classifier is described above in detail.

Still referring to FIG. 1, computing device 104 may initiate at least a corrective action 124. For example, and without limitation computing device 104 may detect an unauthorized individual that approaches the carriage, wherein computing device 104 may initiate corrective action 124 by transmitting a notification and/or signal to the user device that an unauthorized individual has entered safety perimeter 108. In an embodiment, notification and/or signal may include, without limitation, a sound, beep, chirp, noise, vibration, hologram, light, alarm, whistle, and/or another other suitable form of communication to notify authorized individual of an unauthorized individual entering safety perimeter 108. In another embodiment, notification and/or signal may include the use of a light-emitting diode (LED) and/or any other form of light production. As a further non-limiting example, computing device 104 may detect an unauthorized individual entering safety perimeter 108, wherein corrective action 124 may include moving the carriage closer to an authorized individual as a function of the wireless signal strength. As a further non-limiting example, computing device 104 may detect a hazardous object such as a pothole, street, intersection, curb, cliff, wall, car, and the like thereof and apply a braking mechanism to stop and/or restrict movement towards the hazardous object. As a further non-limiting example corrective action 124 may include following and/or remaining close to an authorized individual as a function of the authorized individual moving and/or exiting the safety perimeter. As a further non-limiting example, corrective action 124 may include one or more notifications and/or signals that a fault and/or error has occurred. For example, and without limitation, corrective action 124 may transmit a sound, light, and/or vibration as a function of a sensor failure.

Still referring to FIG. 1, corrective action 124 may include changing one or more functional modes as a function of a fault and/or lack of authorized individual detection. For example, and without limitation, corrective action 124 may detect that an authorized individual has removed a child carriage 100, wherein corrective action 124 may switch and/or allow the change of functional modes from push assist mode to hover mode. As a further non-limiting example, corrective action 124 may detect than an authorized individual has placed a child in carriage 100, wherein corrective action 124 may switch and/or change functional modes from hover mode to shadow mode and/or push assist mode.

Figure 2:
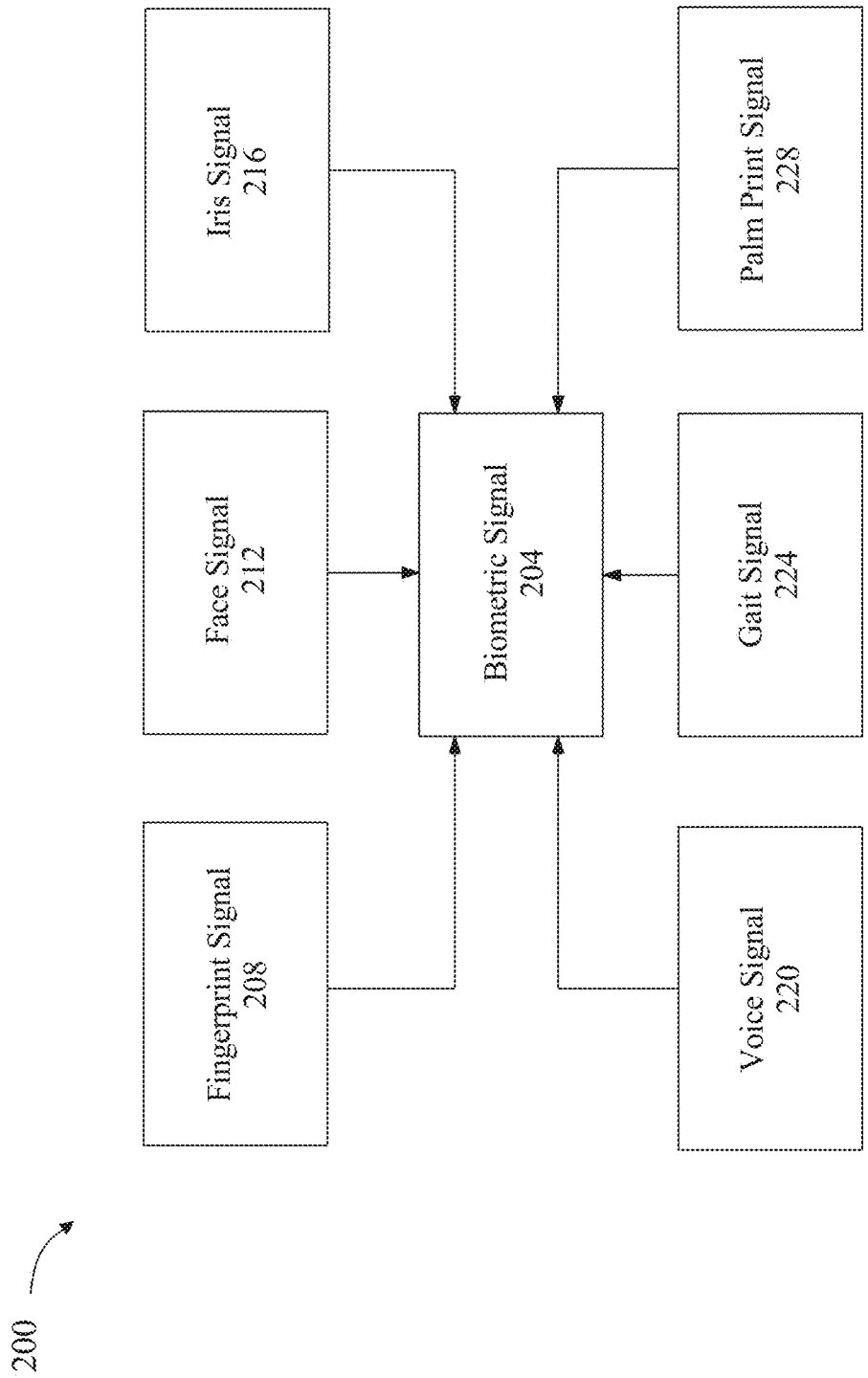
FIG. 2 is a block diagram of a biometric signal according to an embodiment of the invention.

Now referring to FIG. 2, an exemplary embodiment 200 of a biometric signal 204 is illustrated. As used in this disclosure a "biometric signal" is a distinctive, measurable characteristic that labels and/or identifies an individual. For example, and without limitation, biometric signal may include a physiologic characteristic such as, but not limited to, the shape and/or structure of the individual's body, odor, scent, dental patterns, weight, height, dermal viability, and the like thereof. In an embodiment, biometric signal 204 may include a fingerprint signal 208. As used in this disclosure a "fingerprint signal" is a signal representing an image of a fingerprint of a person including, but not limited to arches, whorls, loops, minutiae, and/or furrows. For example, and without limitation, fingerprint signal 208 may include a signal identifying an individual as a function of matching minutiae of fingerprints of an individual to a set of points, wherein the set of points corresponds to a database of points identifying individuals. Fingerprint signal 208 may be captured as a function of one or more optical sensors. For example, and without limitation, optical sensors may include CMOS image sensors, CCD sensors, solid-state sensors, wherein solid-state sensors may include one or more thermal, capacitive, piezoelectric, ultrasound, and/or electric field sensors. In an embodiment biometric signal 204 may include a face signal 212. As used in this disclosure a "face signal" is a signal representing the facial patterns and/or features of an individual. In an embodiment, face signal 212 may include identifying one or more nodal points on a human face that identify endpoints. As a non-limiting example, nodal points may be used to measure variables of a face, such as length and/or width of a nose, cheekbone shape, eye socket depth, and the like thereof. In an embodiment, biometric signal 204 may include an iris signal 216. As used in this disclosure an "iris signal" is a signal representing the patterns and/or features in the region of ring-shaped surrounding of the pupil of the eye. For example, and without limitation, iris signal 216 may determine a color of the iris such as blue, brown, gray, green, and the like thereof.

In embodiment, and still referring to FIG. 2, biometric signal 204 may include a voice signal 220. As used in this disclosure a "voice signal" is a signal representing the vocal patterns and/or speech patterns of an individual. For example, and without limitation, voice signal 220 may identify one or more pitches, tones, and/or frequencies of an individual. As a further non-limiting example, voice signal may identify one or more inflections, cadences and/or texts frequently used by an authorized individual as described above, in detail in reference to FIG. 1. In an embodiment biometric signal 204 may include a gait signal 224. As used in this disclosure a "gait signal" is a signal representing the motion pattern and/or movement patterns of an individual. As a non-limiting example, gait signal 224 may identify one or more walking patterns, jogging patterns, skipping patterns, running patterns, and/or sprinting patterns of an individual. In an embodiment biometric signal 204 may include a palm print signal 228. As used in this disclosure a "palm print signal" is a signal representing the patterns and/or features of the palm region of an individual's hand. As a non-limiting example, palm print 228 may include a pattern and/or feature such as principal lines, wrinkles, secondary lines, epidermal ridges, texture, indents, marks, and the like thereof. In an embodiment biometric signal 204 may include a weight measurement 232. As used in this disclosure a "weight measurement" is a data representing the weight of the individual being carried in the compartment. As a non-limiting example, weight measurement 232 may measure the infant's or child's weight in kilograms or pounds. In an embodiment biometric signal 204 may include a temperature signal 236. As used in this disclosure a "temperature signal" is a signal representing the ambient temperature measured in the environment of the stroller. For example, and without limitation, temperature signal 236 may measure the temperature on the frame of the stroller. As a further non-limiting example, temperature signal may measure the temperature within the compartment. In embodiments, ambient mode may monitor the child's temperature. A child's temperature may be monitored through contact with the stroller.

Figure 3:
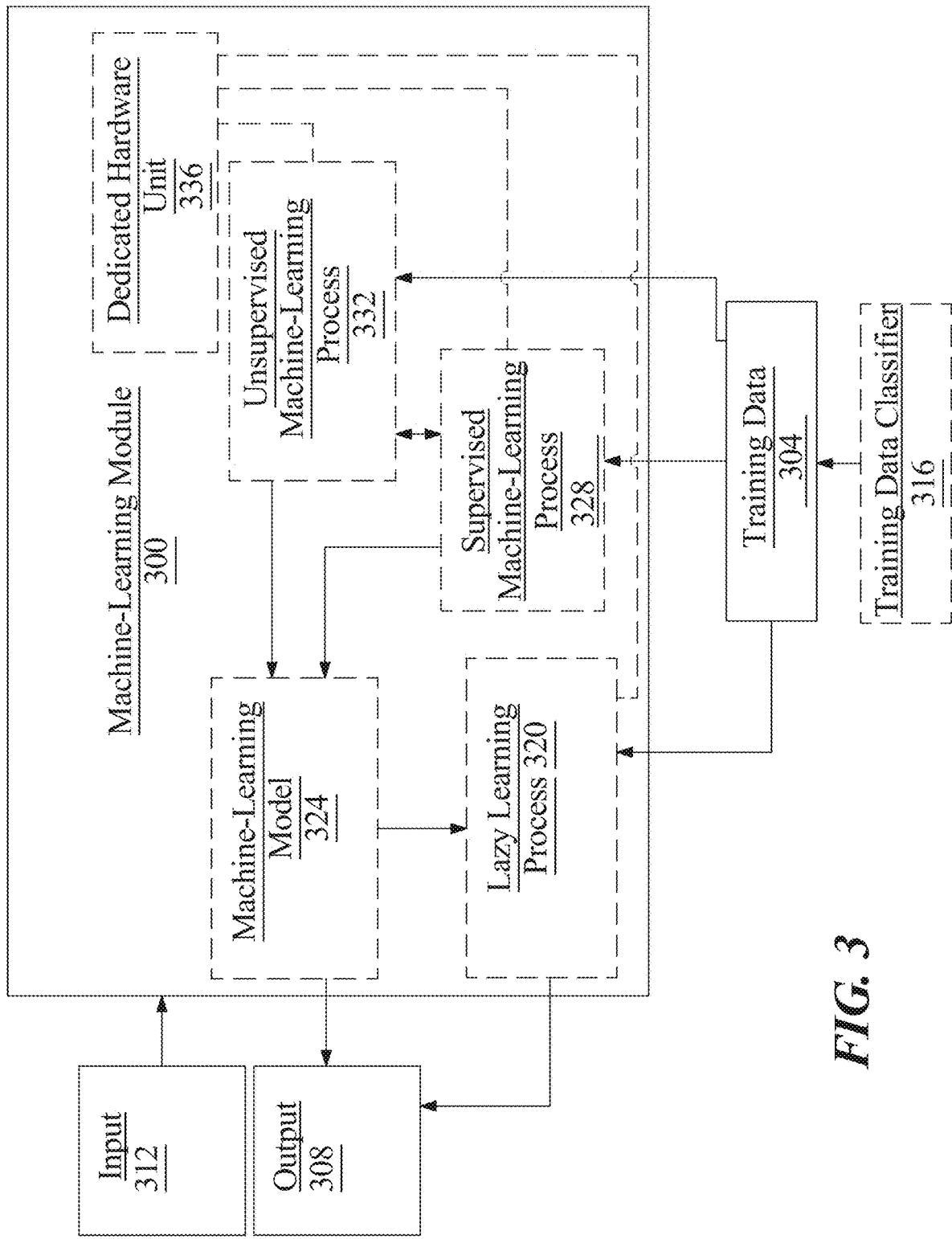
FIG. 3 is a block diagram of an exemplary embodiment of a machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, inputs of a required force and/or a safety perimeter may result in an output of a corrective action.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to authorized individuals sharing similar biometric signals. The use of a machine-learning process and training data as described throughout this disclosure may improve the performance of computing device 104 in performing one or more processes such as determining assistance element 132. For example, a machine-learning model, such as assistance machine-learning model 144, improves the performance power of computing device 104 by producing assistance element 132 output given control limiters and/or motion inputs as inputs. The quantity of data that goes into generating assistance element 132 may vary and fluctuate based on a plurality of variables, such as the quantity of control limiters received as inputs and the like. Without the implementation of a machine-learning model, there would be a trade off in the performance power of computing device 104, such as time and accuracy, in order to sort the data and generate assistance elements 132 that are then used in a separate classification process in order to identify one or more functional modes of a carriage as described above. The ability to continuously train a machine-learning model cable of learning to identify new trends or correlations within a fluctuating quantity of data is a benefit that would not be realized otherwise, without the tradeoff in performance efficiency. In some embodiments, the performance of the machine-learning models may be assessed based on user feedback received, for example, through a user mobile device communicatively connected to computing device 104. Training data may be updated corresponding to the feedback received.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
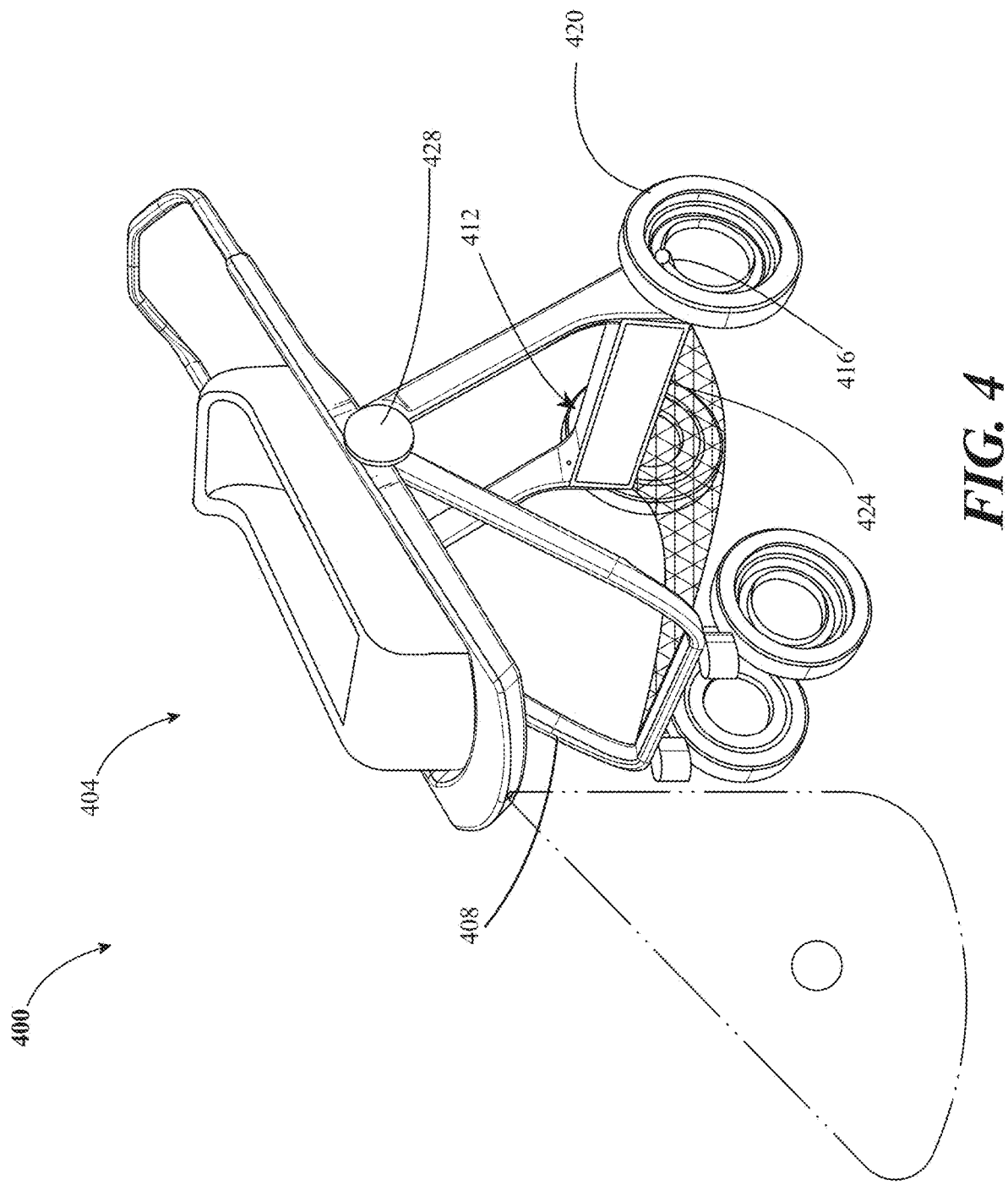
FIG. 4 is a schematic diagram of an exemplary embodiment of a carriage.

Now referring to FIG. 4, an exemplary carriage structure 400 is illustrated. A carriage structure 400 may include a compartment 404. As used in this disclosure a "compartment" is a location and/or environment that is configured to ensconce a child. For example, and without limitation, compartment 404 may include a stroller seat, a bassinet, or a car seat. In an embodiment, compartment 404 may be statically supported by a frame 408. As used in this disclosure a "frame" is an extrusion, such as without limitation a hollow aluminum extrusion. For example, and without limitation frame 408 may include an extrusion composed of a composite material, such as without limitation carbon fiber or fiberglass and resin. Frame 408 may comprise one or more frame elements, such as without limitation posts, beams, cross-braces, and/or members, which may be secured, without limitation by one or more of fasteners, welds, brazes, or adhesives. In some cases, compartment 404 may be removably affixed to frame 408, such that the compartment may be installed or removed from the frame by an operator. Compartment 404 may be removably affixed to frame, without limitation by way of one or more fasteners, snaps, threads, camlocks, and the like.

Still referring to FIG. 4, carriage structure 400 additionally may include a drive motor 412. As used in this disclosure a "drive motor" is a component capable of producing motive power for carriage structure 400. For example, and without limitation, drive motor 412 may include any of a DC motor, a stepper motor, a brushless motor, or a servomotor. Alternatively or additionally, in some embodiments, a drive motor may include a pneumatic motor or a hydraulic motor. Drive motor 412 may be operatively coupled to at least a drivetrain 416. As used in this disclosure a "drivetrain" is a component capable of transferring energy, power, kinetic energy, and/or force to an axle. For example, and without limitation drivetrain 416 may include a gear, a belt, a chain, a pulley, a shaft, a hydraulic system, a pneumatic system, a friction drive. Drivetrain 416 may be further operatively coupled to at least a drive wheel 420. As used in this disclosure a "drive wheel" is a wheel that rotates as a function of the axle driven by the drivetrain. For example, and without limitation, drive wheel 420 may include any wheel configured to contact ground, for example without limitation any of a rim, a tire, or a pneumatic tire. As a further non-limiting example, drive wheel 420 include a hub-less wheel.

Continuing in reference to FIG. 4, may include at least a battery 424 configured to power drive motor 412. As used in this disclosure a "battery" is a power storage and/or power outputting device. For example and without limitation, battery 424 may include a device that produces power as a function of a per unit of volume and/or mass. As a further non-limiting example, battery 424 may include batteries used for starting applications including, but not limited to, Li ion batteries such as NCA, NMC, Lithium iron phosphate (LiFePO4) and Lithium Manganese Oxide (LMO) batteries, wherein Li ion batteries may be mixed with another cathode chemical to provide more specific power if the application requires Li metal batteries. In an embodiment, and without limitation, Li metal batteries may provide a high power on demand. For example, and without limitation, Li metal batteries may include Li ion batteries comprising a silicon, tin nanocrystals, graphite, graphene, or titanate anode, and/or the like thereof. Battery 424 may also include, without limitation, batteries using nickel-based chemicals such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Battery 424 may include, without limitation, lead-based batteries such as without limitation lead acid batteries and lead carbon batteries. Battery 424 may include, without limitation, lithium sulfur batteries, magnesium ion batteries, and/or sodium ion batteries. In an embodiment, battery 424 may include a solid-state battery, supercapacitor, and/or another suitable energy source. In yet another embodiment, battery 424 may include a primary source and/or secondary source and/or a combination of both.

Still referring to FIG. 4, in some embodiments frame 408 may include a hinge 428 that is configured to fold the frame 408. In some cases, folding frame 408 allows for carriage structure 400 to occupy less space and be stored or transported more conveniently.

Figure 5:
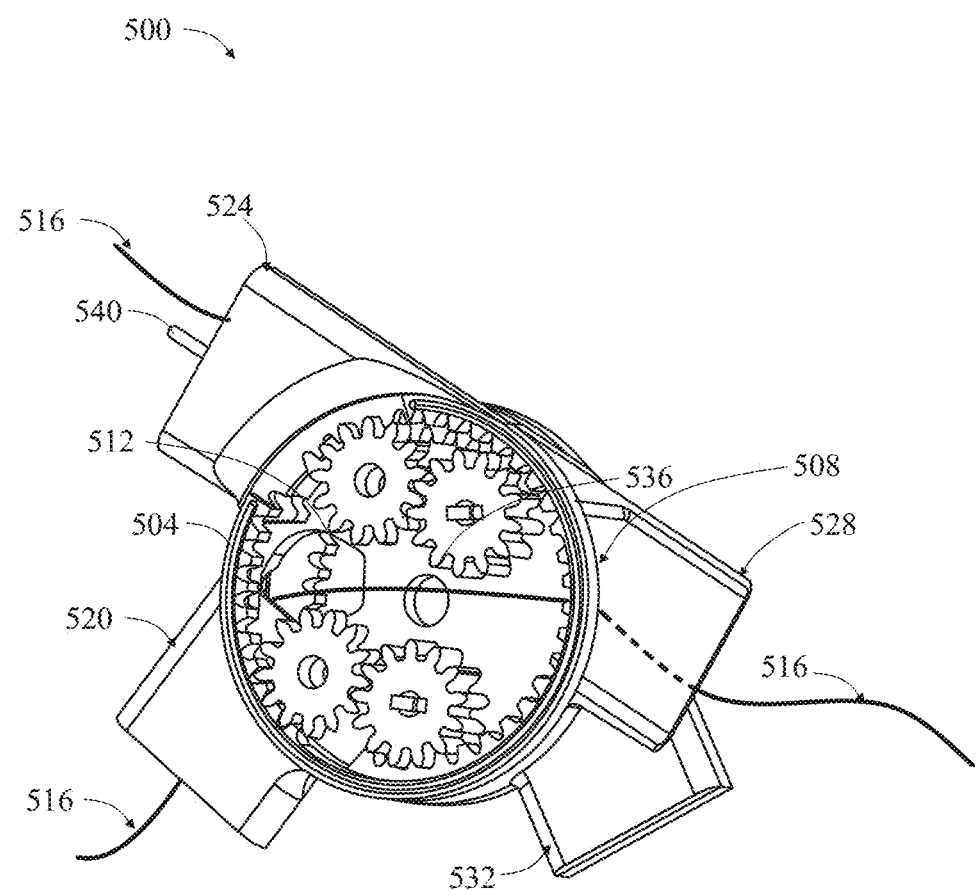
FIG. 5 is a schematic diagram of an exemplary embodiment of a hinge.

Now referring to FIG. 5, a 3D schematic illustrating a non-limiting embodiment of a hinge 500 is shown. In some embodiments, a hinge 500 may include at least a planetary gearbox 504. In some cases, planetary gearbox 504 may include a wireway in which one or more wires may be routed; for example, the wireway may run from a first wire portal 508 to a second wire portal 514 on a second plane of the joint. Planetary gearbox may include, without limitation any of one or more sun gears, one or more ring gears, one or more planet gears, one or more idlers, one or more driven gears, or one or more drive gears. In some embodiments, hinge 500 may be configured to allow at least a wire 516 to be routed through the hinge 500, while in either a folder or unfolder condition. In some cases, hinge 500 may be constituted of multiple layers and at least a wire 516 runs through the multiple layers within the hinge 500. In some embodiments, frame may include one or more arms meeting at hinge 500; for instance, the hinge 500 may be located at a junction of a first arm 520, a second arm 524, a third arm 528, and a fourth arm 532; and the hinge 500 may be configured to route at least a wire 516 from any arm to another. In some cases, hinge may include multiple layers affixed to multiple arms; these multiple layers may be held together by way of any fastener, for instance a collar bolt which is attached by way of a threaded hole 536. In some cases, hinge 500 additionally includes a pin 540 that is configured to arrest operation of the hinge 500, thereby preventing frame from folding. In some cases, pin 540 is connected to a locking mechanism that is configured to lock at least a layer of hinge 500 or arm of frame. In some embodiments, a hinge motor may be operatively coupled to planetary gearbox 504, for example by way of a drive gear, such that the planetary gearbox 504 rotates with the motor; and wherein operating the hinge motor causes hinge 500 to fold frame 408.

Figure 6:
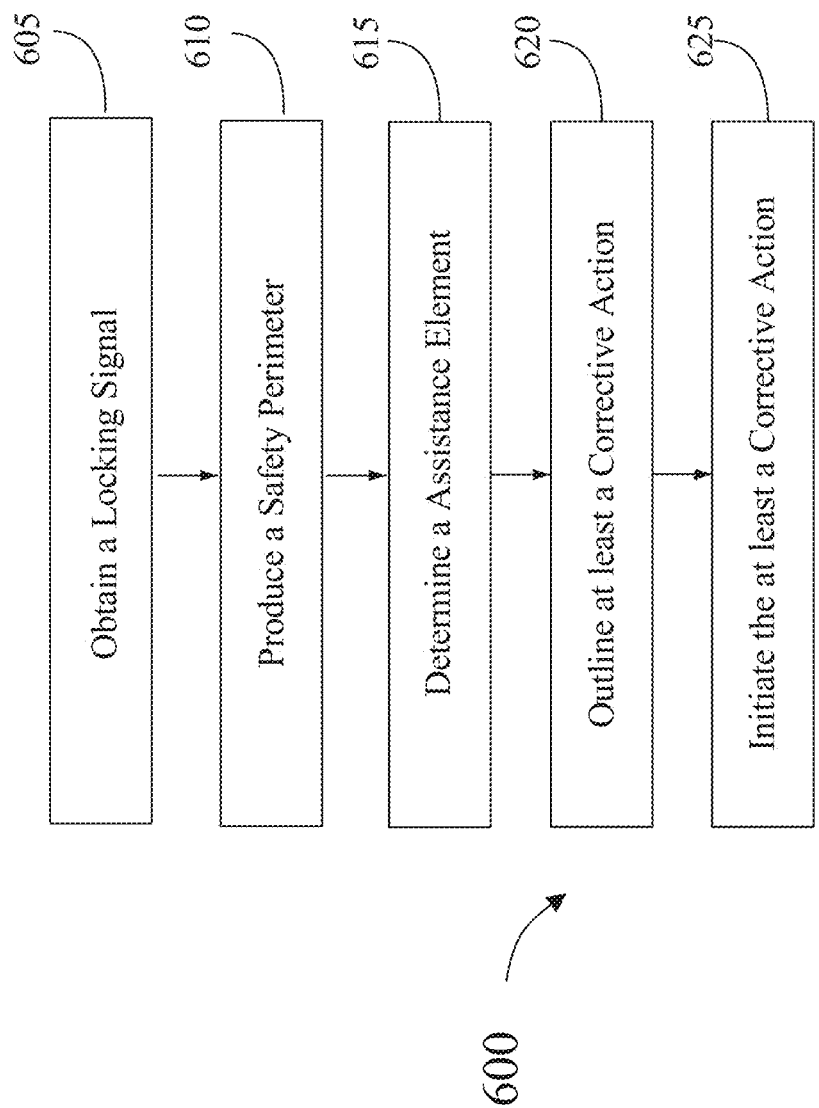
FIG. 6 is a process flow diagram illustrating an exemplary embodiment of a method for guided autonomous locomotion.

Now referring to FIG. 6, an exemplary embodiment 600 of a method for guided autonomous locomotion is illustrated. At step 605, a computing device 104 may obtain a locking signal as a function of a compartment configured to ensconce a child. Locking signal 120 includes any of the signal as described above, in reference to FIGS. 1-5. A compartment includes any compartment as described above, in reference to FIGS. 1-5.

Still referring to FIG. 6, at step 610, a computing device 104 may produce a safety perimeter 108. Computing device 104 includes any of the computing device 104 as described above, in reference to FIGS. 1-5. Safety perimeter 108 includes any of the safety perimeter 108 as described in detail above, in reference to FIGS. 1-5. Computing device 104 may produce safety parameter 108 as a function of receiving at least an environmental input 112 as a function of an environmental sensor 116. Environmental input 112 includes any of the environmental input 112 as described in detail above, in reference to FIGS. 1-5. Environmental sensor 116 includes any of the environmental sensor 116 as described in detail above, in reference to FIGS. 1-5. In an embodiment, safety perimeter 108 may be continuously updated. In an embodiment, and without limitation, safety perimeter 108 may include an occupancy grid map, a localization map and/or a map incorporating one or more road signs, dynamic objects, such as but not limited to cyclists, cars, and the like thereof, and/or static objects, such as but not limited to, trees, fire hydrants, sidewalk signs, and the like thereof. In an embodiment computing device 104 may conduct motion planning. As used in this disclosure "motion planning" is a plan for a destination as a function of safety perimeter 108. Computing device 104 may produce the best possible path as a function of a plurality of possible paths for the carriage to reach the intended destination. Additionally or alternatively, computing device 104 may identify a plurality of safe maneuvers to at least protect and/or secure an object located within the carriage. In an embodiment, and without limitation, computing device 104 may examine the possible paths as well as behaviors planned for each path to select the best possible path as a function of a smoothness, safety, and efficiency.

Still referring to FIG. 6, at step 615, computing device 104 may determine an assistance element. A assistance element 132 may include any assistance element 132 as described above, in reference to FIGS. 1-5.

Still referring to FIG. 6, at step 620, computing device 104 may outline at least a corrective action 124 as a function of the safety perimeter 108. Corrective action 124 includes any of the corrective action 124 as described in detail above, in reference to FIGS. 1-5. Computing device 104 may outline corrective action 124 as a function of determining a required force 128. Required force 128 includes any of the required force, as described in detail above, in reference to FIGS. 1-5. Computing device 104 may outline corrective action 124 as a function of safety perimeter 108 and required force 128 using a corrective machine-learning model 148. Corrective machine-learning model 148 includes any of the corrective machine-learning model 148 as described in detail above, in reference to FIGS. 1-5. In an embodiment, computing device 104 may include a stroller controller, wherein a stroller controller includes any of the stroller controller as described in detail above, in reference to FIGS. 1-5.

Still referring to FIG. 6, at step 625, computing device 104 may initiate corrective action 124. In an embodiment, and without limitation, initiating corrective action 124 may include an iterative process that continually senses and/or updates. In an embodiment, and without limitation, initiating corrective action may include checking for any faults, missed readings, broken sensors, and/or degraded signals.

Still referring to FIG. 6, method 600 may include an environmental input that includes a hazardous indicator. The safety perimeter may be produced as a function of identifying an authorized individual as a using a biometric signal. Producing the at least a safety perimeter further include determining a wireless range as a function of a user device and producing the at least a safety perimeter as a function of at least an environmental input and a wireless limit using a safety machine-learning model. The wireless range may further include identifying a signal strength and determining the wireless range as a function of the signal strength. Initiating the corrective action may further include transmitting a notification to a user device. Determining the assistance element may further include receiving a motion input as a function of a motion sensor and determining the assistance element as a function of the motion input and the control limiter using an assistance machine-learning model. The corrective action may include a braking mechanism. Determining the required force may further include identifying a distance requirement as a function of the safety perimeter and determining the required force as a function of the motion element and distance requirement using a force machine-learning model. Determining the required force may further include identifying a sudden force and determining the required force as a function of the sudden force.

Figure 7A:
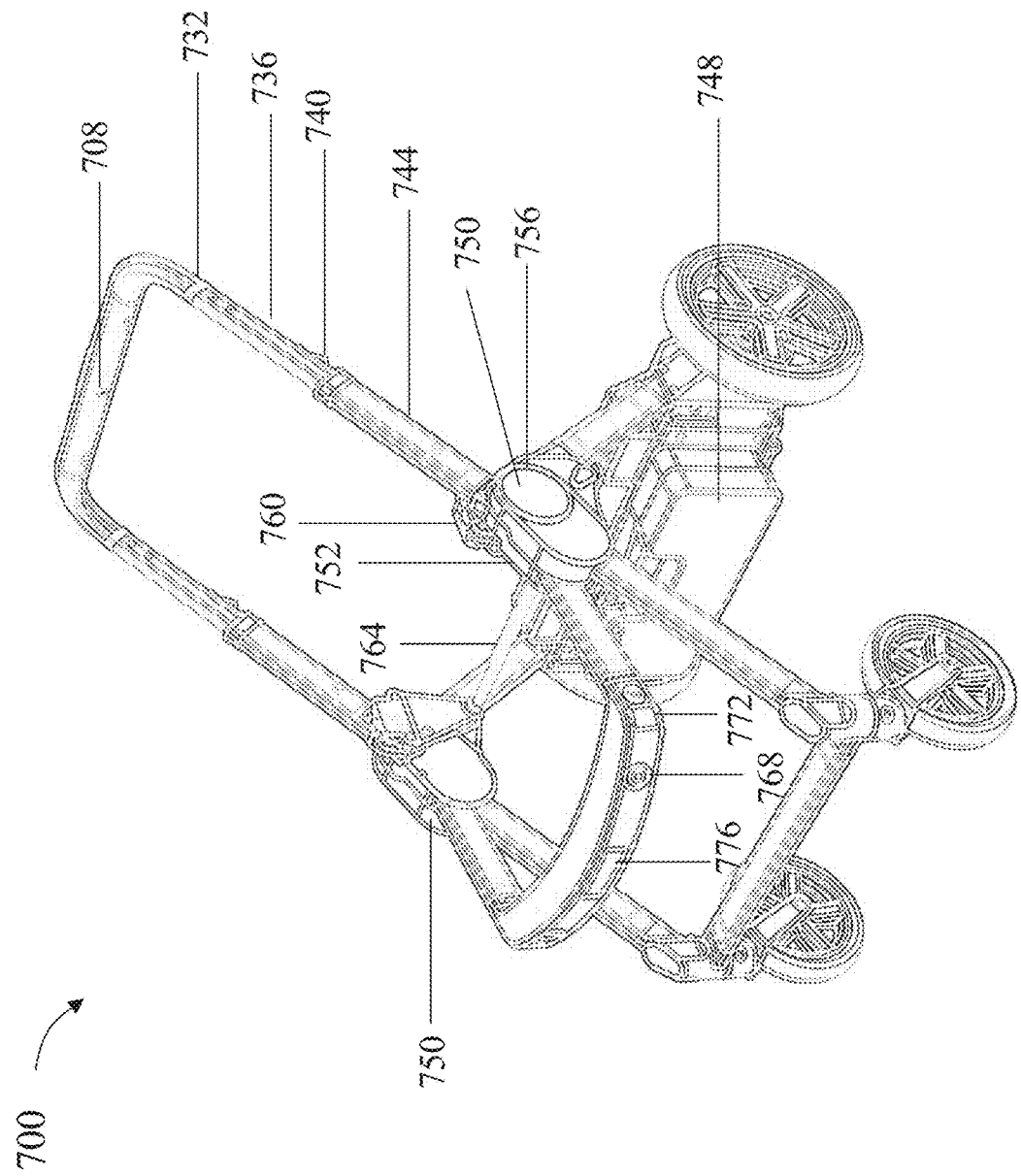
FIGS. 7A-7B is a schematic diagram of an exemplary embodiment of a carriage.
Figure 7B:
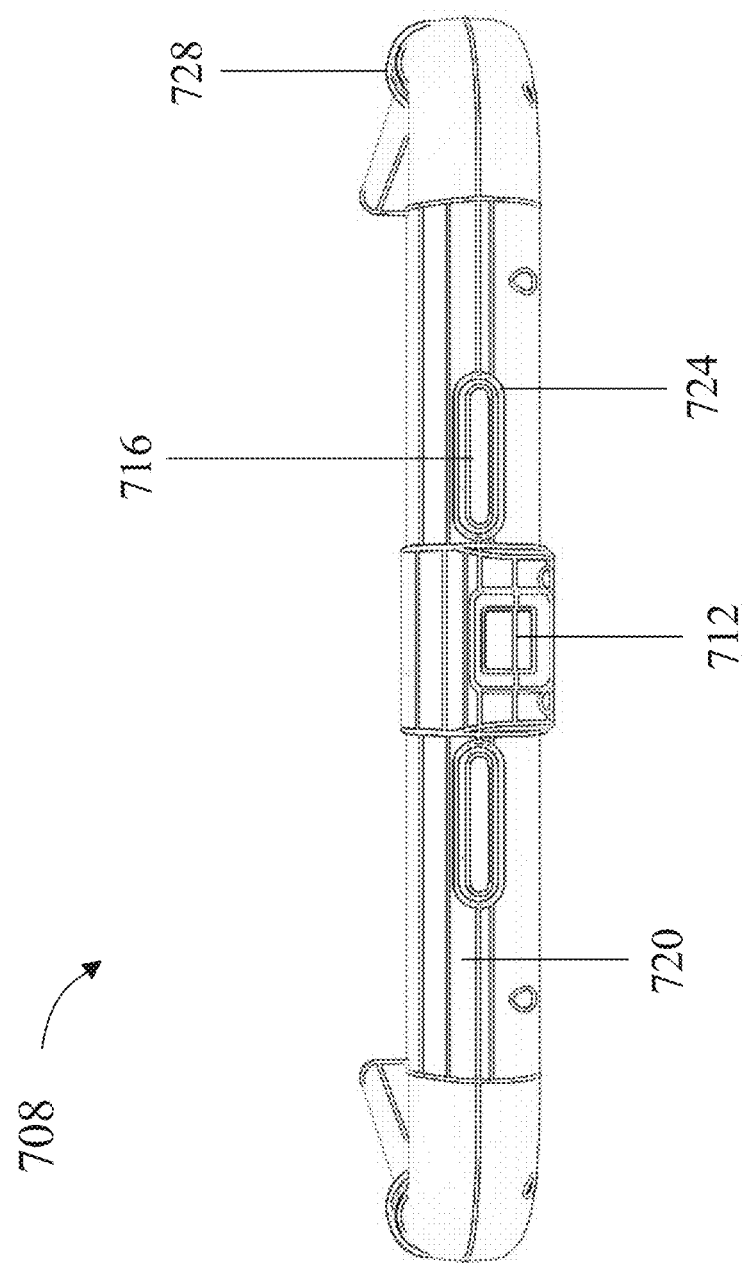

Now referring to FIGS. 7A-B, a schematic diagram of an exemplary embodiment of a carriage structure 700 for guided autonomous locomotion is illustrated. Carriage structure 700 may include components or variations related to carriage structure 400. Carriage structure 700 may include a handle bar 704. A "handle bar," as used herein, is a component used to steer an apparatus. Handle bar 704 may include force sensing technology as well as visual and haptic feedback sensing capabilities as described above. "Haptic feedback," also known as tactile feedback or haptics, is a technology that uses physical sensations or movements to provide users with a sense of touch or feedback in response to their interactions with electronic devices or virtual environments. For example, vibrations and force feedback for alerting a user as described above. In some embodiments, handlebar may be covered by leather, fabric, plastic, or any other protective material. Handle bar 704 may include a button 708. Button 708 may be used to toggle different features of carriage structure 700 such a push-assist mode or any other functional mode as described in FIG. 1. In some embodiments, a user may activate and toggle among features/modes using user device/user computing device communicatively connected to computing device 104. In some embodiments a functional mode may include a rocking mode, wherein carriage 700 may include actuators configured to rock or sway a seat locked into carriage 700. In some embodiments, compliant mechanisms, such as springs may be used to reciprocate the motion provided by an actuator in order to help provide the rocking motion. In some embodiments, rocking mode may cause stroller to move forward and backward, solely and repeatedly using drive motor 412. Examples may include, a foot activated brake, a one-handed folding mechanism, adjustable handle bar 704, self-propulsion (built-in motors or mechanisms that can move the carriage structure 700 forward with a simple push or touch of a button, reducing the physical effort required to push carriage structure 700), and the like.

With continued reference to FIGS. 7A-B, an actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

With continued reference to FIGS. 7A-B, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIGS. 7A-B, in some embodiments, actuator may include a pneumatic actuator. In some cases, a pneumatic actuator may enable considerable forces to be produced from relatively small changes in gas pressure. In some cases, an pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIGS. 7A-B, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

With continued reference to FIGS. 7A-B, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

Still referring to FIGS. 7A-B, handle bar 704 may include a rear camera window 712. Rear camera window 712 may enable carriage structure 700 to recognize who the user is via machine vision and machine learning as described above. Rear camera window 712 may allow a rear camera to aid computing device 104 in locking carriage structure 700 when an unauthorized user tries to use the stroller. For example, the wheels of carriage 700 may locked or prevented from moving using a manually actuable and/or a programmatically actuable pin parking break as described further below. A rear camera may be configured to allow computing device 104 to capture an image of an individual, detect the presence of an individual, and/or detect the distance between the individual and the rear camera. The rear camera may include machine visions system and/or any other camera/imaging devices as disclosed herein. Computing device 104 may use the data captured from the rear camera and other devices as describe herein for user identification purposes, such as facial recognition, distance measuring, Bluetooth communication and the like. For example, computing device 104 my determine the identity of an individual based on a Bluetooth ID (Bluetooth MAC Address) or user device name of a device when computing device 104 is communicatively connected to a user device of an individual operating carriage structure 700. Additionally, Bluetooth communication may include Bluetooth range finding capabilities such as computing device 104 detecting one or more user operated computing devices within in a predetermined range of carriage structure 700. For example, computing device 104 may measure a received signal strength indicator (RSSI), which is a metric indicating how strong a received signal is, from a user device to estimate the approximate range. In some cases, carriage structure 700 may include multi-level/tired system of sensors, wherein the case of a sensor failure a different sensor may be used to perform a desired or similar function/goal.

Still referring to FIGS. 7A-B, handle bar 704 may include an LED window 716, LED window cover 724, internal or external vibration motors 720 for haptic feedback. An "LED window," as used herein, is a compartment integrating LED lights. An "LED window cover," as used herein, is a protective cover placed over an LED window. Handle bar 704 may include a joint cover 728 that covers the connection between a handlebar telescoping tube and a handlebar grip in order to enable force sensing capabilities while reducing unwanted sensitivity.

Still referring to FIGS. 7A-B, handle bar 704 may include a telescoping mechanism to extend and retract the length of handle bar 704 for ease of use for both taller and shorter users. A "telescoping mechanism," also known as a telescopic mechanism, refers to a system that allows one part to slide or extend into another, similar to the way a telescope's tubes slide in and out to adjust its length. The telescoping mechanism may include a grip cover 732 covering the extension of tubes and/or material such as inner tubes 736 that may be configured to extend inward and outwards. A "grip cover," as used herein, is a protective accessory designed to be placed over an object to provide grip to a user. The telescoping mechanism may include outer tubes 744 which may, in some position, house the telescoped areas of the inner tube 736. Tigger buttons 740 may be located on either inner tube, wherein trigger buttons 740 enable not only the telescoping, and/or the folding of the carriage structure 700. Additionally, carriage structure 700 may include a removable battery 748. Battery 748 may include a battery management system that attached a to a rear drive train as described further below.

Still referring to FIGS. 7A-B, carriage structure 700 may include two main joints 750 that folds the front leg, rear leg, sensor frame, and handlebar in one combined action. The main joints 750 may include configurations in reference to hinge 500. The main joints 750 may include an inner cover 752 wherein an inner plate comes out to fill the gaps created by the legs, sensor frame, and handlebar of carriage structure 700. The main joints 750 may include an outer cover 756. The main joints 750 may include an adaptive seat connector 760 configured to connect a bassinet, seat, or other attachment to carriage structure 700. An "adaptive seat connector," is a type of mechanism or component used to securely attach a seating device to a base. The main joint may include a lift bar 764 configured to allow carriage structure 700 to be lifted when folded. A "lift bar," for the purposes of this disclosure is a component that allows an object to be lifted or carried easily. In some embodiments, lift bar 764 may include a detachable lift bar. A "detachable lift bar," as used herein, is a lift bar that is able to be detached from the object without damaging said object. A detachable lift bar is detachable, as in, the detachable lift bar may be removed from carriage structure 700. For example, detachable lift bar may be able to be removed by unscrewing screws, pushing in tabs, undoing fasteners, and the like.

Still referring to FIGS. 7A-B, carriage structure 700 may include a sensor unit further including a microcontroller as well as multiple ultrasonic sensors 768 and cameras. The sensor included in the sensor unit may function similarly to the sensors as described for carriage structure 400, such as environmental sensor 116, in addition to having a configuration that improves the foldability of carriage structure 700.

The sensor unit may include a ultrasonic sensor 768, a camera 772, and a stereoscopic camera 776. An "ultrasonic sensor," is a type of sensor that uses ultrasonic waves to detect the presence or distance of objects in its vicinity. Examples of ultrasonic sensor 768 may include a Maxbotix, Parallax Ping, and the like, type of ultrasonic sensor. Examples of ultrasonic sensor 768 may include a proximity ultrasonic sensor, distance measurement ultrasonic sensor, doppler ultrasonic sensor, and the like. A "stereoscopic camera," as used herein, is a type of camera system that is designed to capture images or videos in three dimensions. In some embodiments, the sensor unit may include a plurality of sensors, for example five ultrasonic sensors, each of which facing a different direction to increase the detection capabilities of carriage structure 700.

Figure 8:
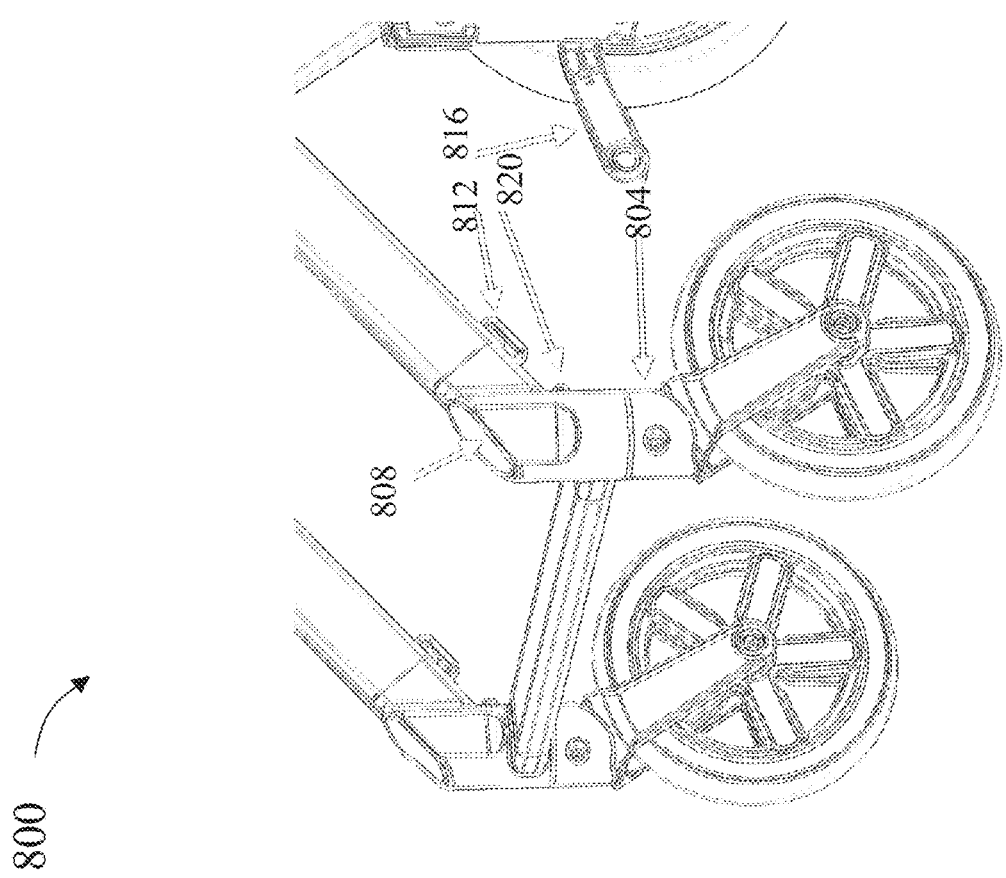
FIG. 8 is a close up view of a front caster for a carriage.

Referring now to FIG. 8, a close-up view of a front caster 800 for carriage structure 700 is illustrated. Front caster may include a lockable swivel 804 with internal suspension. Locking a swivel may include a swivel caster brake or caster wheel brake to prevent rotation. Such mechanisms may include a lever or pedal that is connected to a braking system, for example, an actuable pin parking break as described below. A "front caster," as used herein, in the wheel assembly or component located at the front of the carriage structure 700. An internal suspension may include springs, elastomeric materials, other dampening mechanisms, and the like. Front caster 800 may include removable modular cap 808 which may house any sensors as described above. Front caster 800 may include basket hooks 812. Front caster may include a folding latch 816 to keep carriage structure 700 locked in a folded state. Front caster may include a folding latch locking pin 820. When in a folded state, folding latch 816 may connect to folding latch locking pin 820 using a hook and loop method, buttoning method, tapping method, and the like. For example, folding latch 816 may include a strap with a component on one end configured to snap, button, or stick onto folding latch locking pin 820.

Figure 9A:
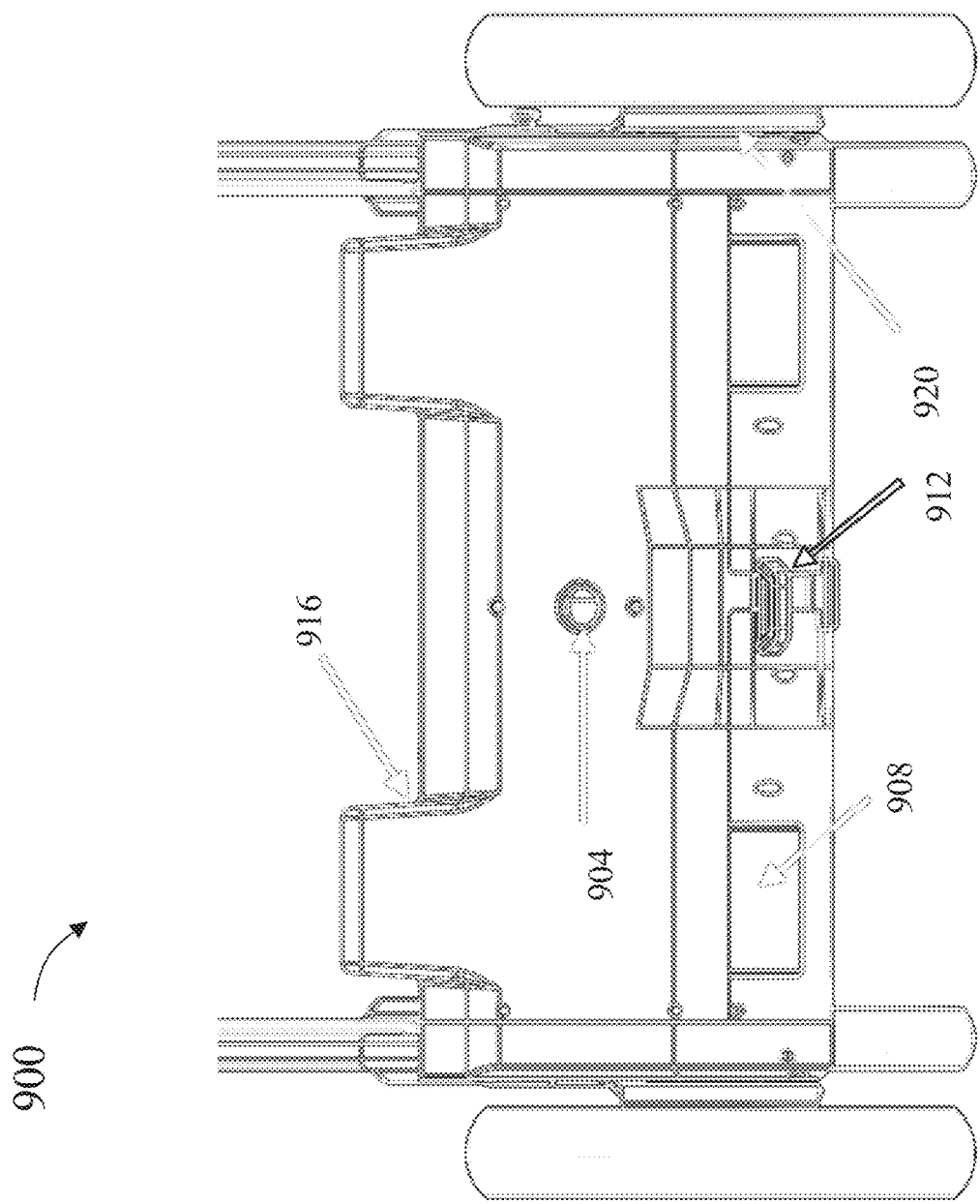
FIGS. 9A-B is a close up view of a rear drive train for a carriage.
Figure 9B:
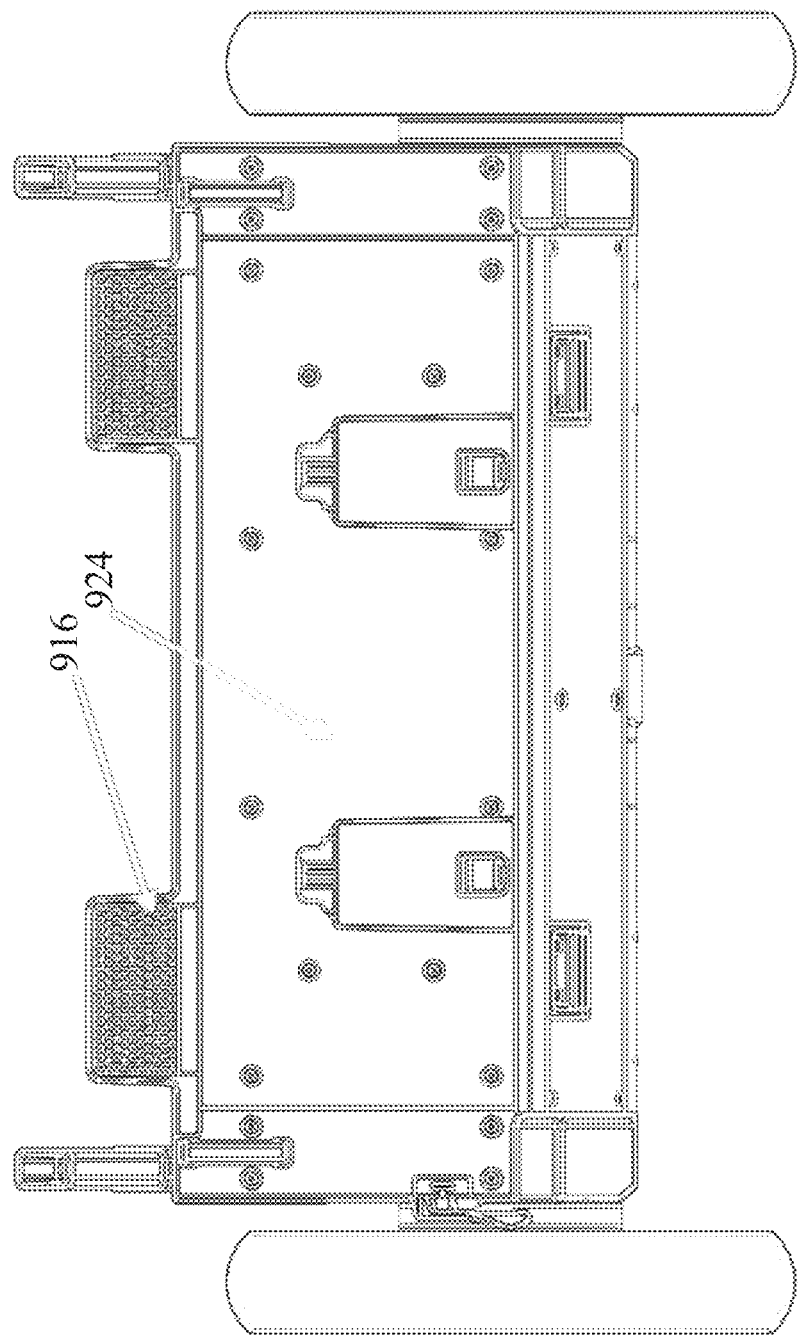

Referring now to FIGS. 9A-9B, a close up view of a rear drive train 900 for carriage structure 700 is illustrated. Rear drive train 900 may be consistent with aspects of drive motor 412 along with similar functionality. Rear drive train 900 may include a rear ultrasonic sensor 904. Rear drive train 900 may include an air vent outlet 908 for thermo-control purposes. Rear drive train 900 may include a manually actuable and/or a programmatically actuable pin parking break 912. An "actuable pin parking brake," (also known as an "actuated pin parking brake") is a type of parking brake mechanism configured to secure a carriage structure 700 or equipment in a stationary position when not in use, preventing unintentional movement. Actuable pin parking brake 912 may include: an actuator at initiates the engagement or disengagement of the parking brake; an actuating pin (metal pin or rod) that extends or retracts when the parking brake is engaged or released; a brake Lever or pedal to engage or disengage the parking brake; and a brake release handle that allows the user to disengage the brake and release the pin, allowing carriage structure 700 to move freely. Rear drive train 900 may include an air intake component 916 for thermo-control purposes. Rear drive train 900 may include a pin brake receiving pad 920. A "pin brake receiving pad," as used herein, is a component that an actuating pin makes contact with when a parking brake is engaged. When an actuating pin comes into contact with the receiving pad, it may create friction or apply pressure to secure the brake, preventing the wheel or object from moving. A pin brake receiving pad may be composed of material such as rubber, rubber compounds, urethane, composite materials, metallic pads, and the like. Rear drive train 900 may include a battery receiving plate 924. For example, battery receiving plate 924 may be shaped in a similar to battery wherein a battery may be fit inside the compartment. In other embodiments, battery receiving plate 924 may include devices such as straps, button, pins, hooks, screws, and the like to hold a battery in place. A "battery receiving plate," as used herein, is a compartment configured to hold a battery. Internally, rear drive train 900 may, with reference to FIG. 4, house custom motors, custom motor controllers, microcontrollers on custom PCBs (Printed Circuit Boards), fans, speakers, GPS modules, servo motors, DCDC converters (voltage converters or voltage regulators), and the like.

Figure 10:
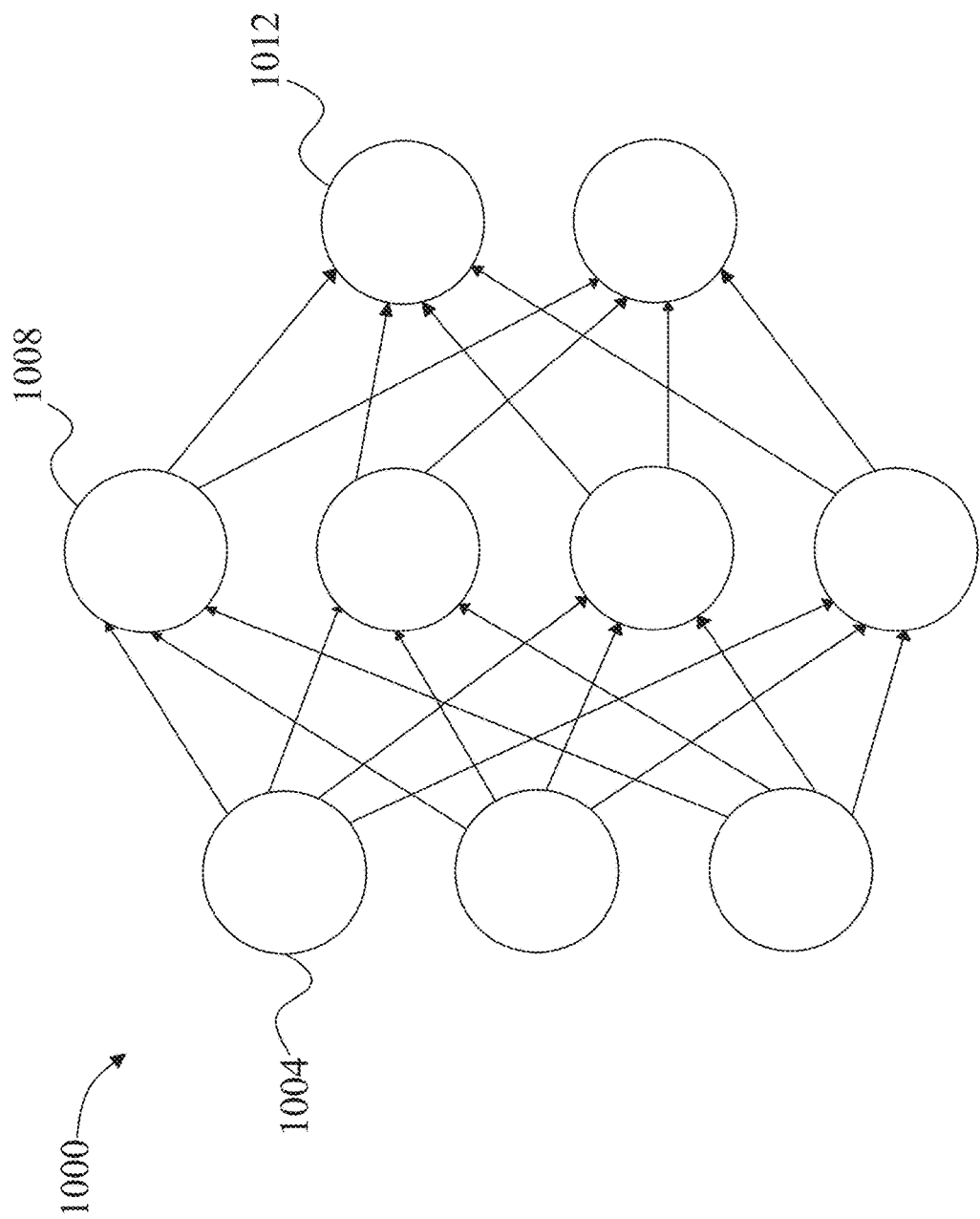
FIG. 10 is diagram of an exemplary embodiment of on a neural network.

Referring now to FIG. 10, an exemplary embodiment of neural network 1000 is illustrated. A neural network 1000 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 1004, one or more intermediate layers 1008, and an output layer of nodes 1012. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 11:
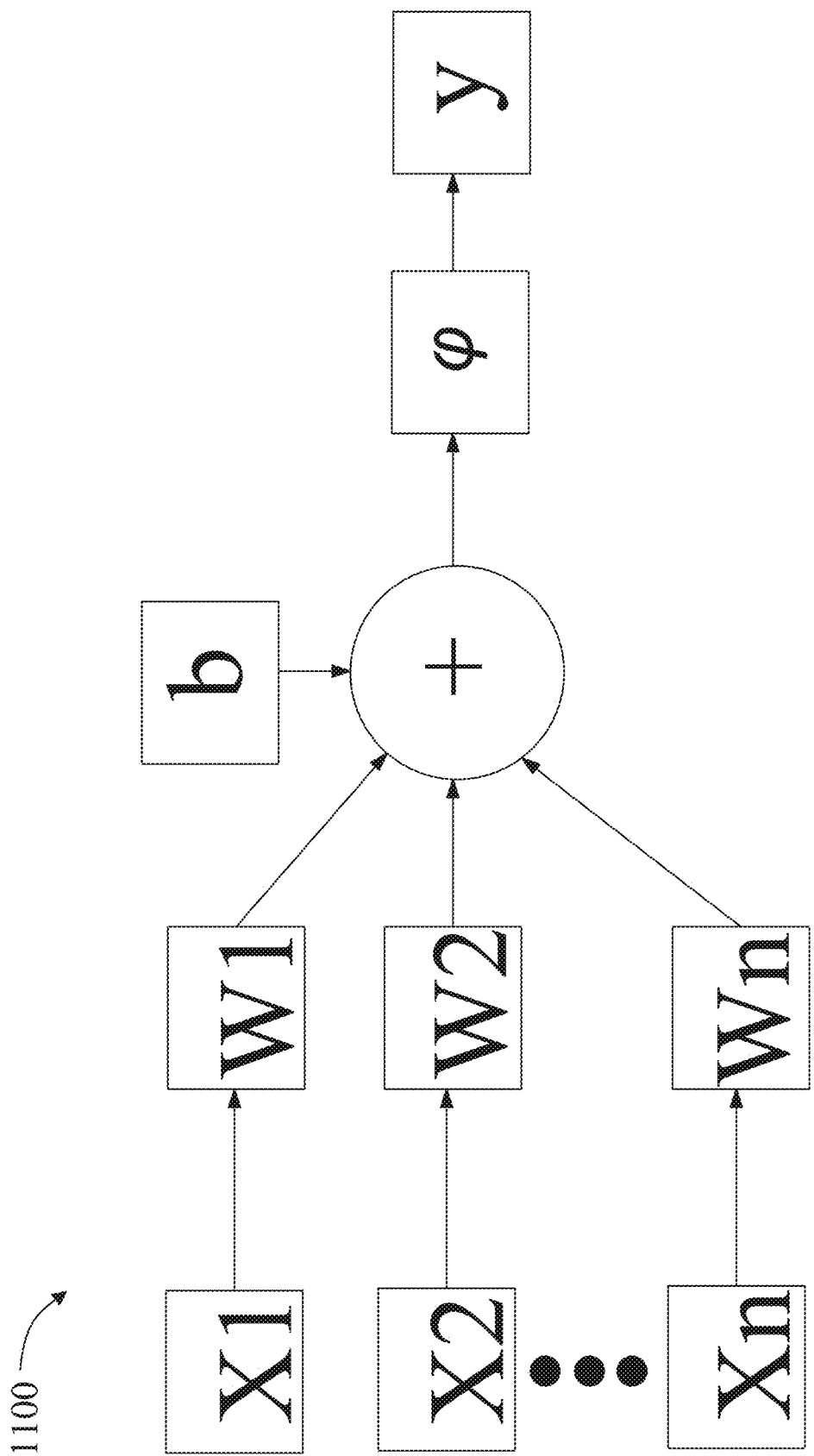
FIG. 11 is a diagram of an exemplary embodiment of nide of a neural network

Referring now to FIG. 11, an exemplary embodiment of a node 1100 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(\alpha x, x)$ for some $\alpha$, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs x, that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, an edge computing device, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
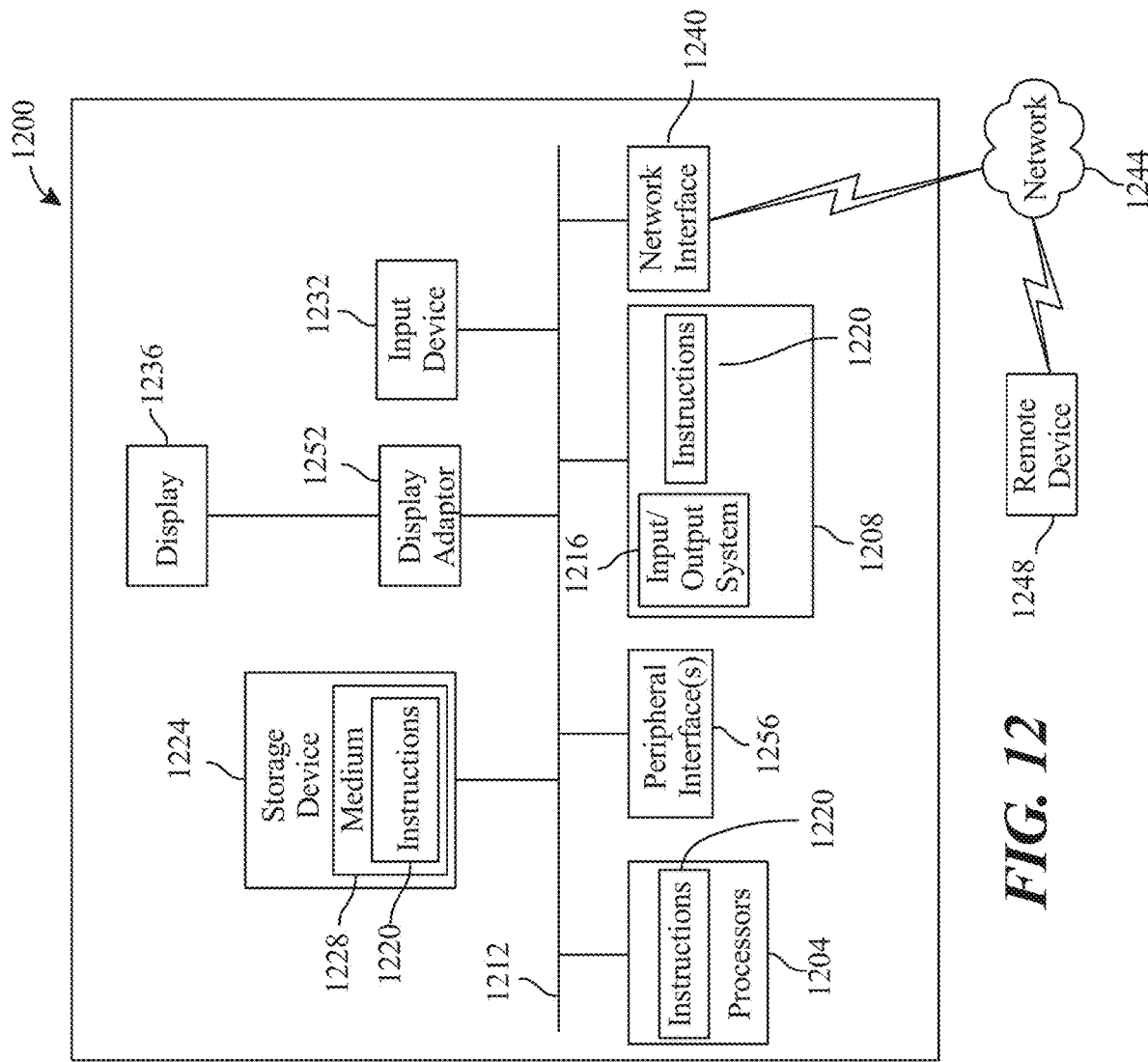
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC)

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a loadcell, a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve carriages and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A carriage for guided autonomous locomotion, the carriage comprising:
    a handle bar comprising a rear camera configured to detect an individual;
    a computing device configured to:
        identify an authorized individual using the rear camera;
        detect an unauthorized individual;
        obtain a locking signal as a function of a compartment configured to ensconce a child;
        produce a safety perimeter, wherein producing the safety perimeter further comprises:
            generating at least an environmental input using an environmental sensor; and
            producing the safety perimeter as a function of the at least an environmental input;
        determine an assistance element, wherein the assistance element comprises one or more external forces acting on the carriage, and wherein determining the assistance element comprises:
            identifying a control limiter; and
            determining the assistance element as a function of the control limiter;
        outline at least a corrective action, comprising a first response and a second response the computing device performs, as a function of the safety perimeter and assistance element, wherein outlining the at least a corrective action further comprises:
            determining a required force as a function of the assistance element; and
            outlining the first response as a function of the safety perimeter and the second response as a function of the required force using a control machine-learning model; and
        initiate the at least a corrective action as a function of the detected unauthorized individual wherein the at least a corrective action comprises transmission of a notification to a user device that the detected unauthorized individual has entered the safety perimeter.

2. The carriage of claim 1, wherein the handle bar comprises at least a vibration motor configured to produce haptic feedback.

3. The carriage of claim 1, wherein the handle bar further comprises a telescoping mechanism.

4. The carriage of claim 1, wherein the handle bar further comprises a button configured to switch modes of the carriage.

5. The carriage of claim 1, further comprising a sensor unit wherein the sensor unit comprises five ultrasonic sensors each facing a different direction.

6. The carriage of claim 1, further comprising a rear drive train comprising an actuable pin parking brake.

7. The carriage of claim 1, wherein the handle bar further comprises LED windows, wherein the handle bar is configured to transmit a notification to a user.

8. The carriage of claim 1, wherein the safety perimeter is further produced as a function of the authorized individual.

9. The carriage of claim 1, wherein:
    determining the assistance element further comprises identifying a motion input associated with the control limiter; and
    determining the assistance element as a function of the control limiter further comprises determining the assistance element as a function of the control limiter and the motion input.

10. A method of use of a carriage for guided autonomous locomotion, wherein the method comprises:
    identifying, using a computing device communicatively connected to a rear camera, an authorized individual;
    detecting, using the computing device, an unauthorized user;
    obtaining, using the computing device, a locking signal as a function of a compartment configured to ensconce a child;
    producing, using the computing device, a safety perimeter, wherein producing the safety perimeter further comprises:
        generating, using the computing device, at least an environmental input using an environmental sensor; and
        producing, using the computing device, the safety perimeter as a function of the at least an environmental input;
    determining, using the computing device, an assistance element, wherein the assistance element comprises one or more external forces acting on the carriage, and wherein determining the assistance element further comprises:
        identifying, using the computing device, a control limiter; and
        determining, using the computing device, the assistance element as a function of the control limiter;
    outlining, using the computing device, at least a corrective action, comprising a first response and a second response the computing device performs, as a function of the safety perimeter and the assistance element, wherein outlining the at least a corrective action further comprises:
        determining, using the computing device, a required force as a function of the assistance element; and
        outlining, using the computing device, the first response as a function of the safety perimeter and the second response as a function of the required force using a control machine-learning model; and
    initiating, using the computing device, the at least a corrective action as a function of the detected unauthorized individual wherein the at least a corrective action comprises transmission of a notification to a user device that the detected unauthorized individual has entered the safety perimeter.

11. The method of claim 10, wherein the rear camera is disposed in a handle bar of the carriage.

12. The method of claim 11, wherein the handle bar comprises at least a vibration motor configured to produce haptic feedback.

13. The method of claim 11, wherein the handle bar further comprises a telescoping mechanism.

14. The method of claim 10, wherein a mode comprises a hands-free mode.

15. The method of claim 10, wherein the environmental sensor comprises an ultrasonic sensor.

16. The method of claim 10, wherein the at least a corrective action includes using a braking mechanism.

17. The method of claim 10, wherein the safety perimeter is produced as a function of identifying an authorized individual using a biometric signal.

18. The method of claim 10, wherein:
    determining the assistance element further comprises identifying a motion input associated with the control limiter; and determining the assistance element as a function of the control limiter further comprises determining the assistance element as a function of the control limiter and the motion input.

* * * * *